United States Patent [19]
Rentsch et al.

[11] Patent Number: 5,794,308
[45] Date of Patent: Aug. 18, 1998

[54] HINGE

[75] Inventors: Rudolf Rentsch, Erlenbach, Switzerland; Bruce Mueller, Mukwonago, Wis.

[73] Assignee: Creanova AG, Baar, Switzerland

[21] Appl. No.: 696,865

[22] PCT Filed: Feb. 23, 1995

[86] PCT No.: PCT/EP95/00651

§ 371 Date: Nov. 27, 1996

§ 102(e) Date: Nov. 27, 1996

[87] PCT Pub. No.: WO95/23097

PCT Pub. Date: Aug. 31, 1995

[30]  Foreign Application Priority Data

Feb. 23, 1994 [CH] Switzerland ............... 00530/94

[51] Int. Cl.$^6$ ........................................... E05D 1/00
[52] U.S. Cl. ............... 16/225; 16/221; 16/319; 16/337; 16/DIG. 13; 220/339; 220/4.22
[58] Field of Search ............... 16/225, 221, 319, 16/337, DIG. 13; 220/339, 337, 375, 4.22; 215/235

[56]  References Cited

U.S. PATENT DOCUMENTS

| | | | |
|---|---|---|---|
| 3,135,456 | 6/1964 | Palazzole | 220/4.22 |
| 3,152,716 | 10/1964 | Feldhahn | 16/DIG. 13 |
| 3,516,115 | 6/1970 | Koleske | 16/225 |
| 3,793,612 | 2/1974 | Driscoll | 16/DIG. 13 |
| 4,158,902 | 6/1979 | Chernack et al. | 16/DIG. 13 |
| 4,503,991 | 3/1985 | Joyce | 16/339 |
| 4,594,816 | 6/1986 | Goldstein | 16/225 |
| 4,636,065 | 1/1987 | Kanemitsu et al. | 16/DIG. 13 |
| 5,445,471 | 8/1995 | Wexler et al. | 16/280 |

*Primary Examiner*—Chuck Mah

[57]  ABSTRACT

A resilient hinge arrangement has a first hinge part and a second hinge part that assumes a plurality of stable pivoting positions with respect to the first hinge part, with a dead center lying at least between two of the stable pivoting positions. The second hinge part is arranged to return from pivoting positions between the two stable pivoting positions through the dead center, outside a dead center itself, in an elastically resilient manner into a nearest one of the stable pivoting positions. Two connecting arms are spaced a distance apart and include at least one coupling element protruding movably from each of the first and second hinge parts, and at least one substantially flexurally rigid intermediate part between the coupling elements that is delimited by two bending regions that are spaced apart and arranged at an angle to each other between the intermediate part and the coupling elements. Each of the two connecting arms is substantially stress free in an opened position and a closed position of the first hinge part relative to the second hinge part at a point at which the bending regions come closest to each other. Each coupling element is arranged to execute a maximum elastic relieving movement in a region of the dead center upon pivoting movement of the second hinge part with respect to the first hinge part between the two stable pivoting positions through the dead center.

31 Claims, 16 Drawing Sheets

HINGE

BACKGROUND OF THE INVENTION

1. Field of the Invention

The present invention relates to a resilient hinge arrangement and, more particularly, to a resilient hinge arrangement without a main film in which a first and second hinge part can assume a plurality of stable positions with respect to each other.

2. Description of Relevant Art

For the jointed hinge connection, in particular of plastic closures injection-molded in one piece, various designs are known. Generally, in the case of such one-piece plastic closures, two hinge parts to be pivoted with respect to each other are connected by a main hinge or a plurality of main hinges lying on an axis (axial portions). In order to obtain a snap effect on actuating the hinge, i.e. perceptible and defined opening and closing positions by overcoming a dead center position, there is generally provided at least one additional intermediate element, spring element, taut band or corresponding elements. These are arranged laterally of the main hinge, or in the case of a plurality of main hinges between them, and are connected to the two hinge parts. The intermediate elements or taut bands are in this case arranged such that the main hinge lies outside the plane(s) defined by the connecting locations of the intermediate elements with the closure parts. This offset of the main hinge with respect to the coupling locations of the intermediate elements (joint axis offset) leads during the opening and closing of the hinge to tensile and compressive forces, which are transferred and absorbed by the intermediate elements and the main hinge and bring about the snapping effect.

Such a functional principle based on a joint axis offset, in which the hinge parts pivot about a defined main axis, arranged rigidly with respect to the hinge parts, and supplementary functional elements experience a geometrical deflection with respect to their coupling locations on the hinge parts are known, for example, from patent specifications DE 1813187, EP 0056469, CH 488085, EP 0447357, or patent applications EP 524275 and DE P 43 35 107.7 of 14.10.1993.

Apart from the generally known problem of high or disproportionate material stresses (risk of material tears or ruptures in the hinge region), a further disadvantage of such systems is that, owing to the required main film hinges, the spatial path of movement of the hinge parts is greatly restricted and, owing to the necessary offset, the main film hinges protrude beyond the closure contour. The mutual position of the hinge parts in the two positions of rest, i.e. in the closed state and opened state, and also during the movement is not significantly influenceable, since a pure axial rotation takes place. Moreover, the corresponding hinge arrangements bring with them various restrictions and constraints with respect to the aesthetic and geometrical configuration of the hinge parts. The kinematics of such designs is also influenced greatly by the actual configuration of the hinge parts, the material used and, in the case of plastic injection-molded parts, by the actual production process, the mold and by the production tolerances. It is not uncommon for such constraints to bring about designs which are not appropriate for the material, are susceptible to damage in production and with respect to the service life in normal use.

A design without a main hinge is known from U.S. Pat. No. 3,135,456. Two parts of a container to be pivoted with respect to each other are connected to each other there by an elastomeric lug attached on the outside. This design does not solve the problem of high material elongations, but seemingly circumvents it by elastomeric, highly extensible material being used. The hinge is subjected to high material loads and furthermore has an extremely unstable, unpredictable large-area inversion behavior.

European patent specification EP 0 331 940 discloses a bistable hinge device which takes account of the above disadvantages in significant regions. This hinge device avoids a main hinge directly connecting the two hinge parts. The hinge parts are connected to each other by two identical, symmetrical connecting arms, each of these connecting arms including two cantilever arms, which connect said connecting arms to the hinge parts. The cantilever arms are for their part connected to each other by a substantially triangular plate. The hinge arrangement according to that invention is distinguished by a relatively large opening angle and an above average snapping effect and, in spite of a relatively rigid design, does not lead to excessive stressing of the material.

U.S. Pat. No. 5,148,912 describes a hinge arrangement in which the two hinge parts are connected to each other via two connecting arms which are homogeneously flexible or elastic over their entire length. On account of the circular contour of the two hinge parts, the two connecting arms are inevitably given, however, by chance a trapezoidal shape. This hinge according to the prior art has neither rigid intermediate parts which have a trapezoid form nor coupling elements which are formed onto the hinge parts. The known hinge therefore also does not exhibit a good snapping effect. That is to say the opened position and closed position are not stable positions of the hinge parts into which the latter automatically return from the pivoting positions lying in between.

WO-A-92 13 775 describes a hinge arrangement in which the connecting arms are produced from spring-like elements. These exhibit neither trapezoidal intermediate parts nor coupling elements formed onto the hinge parts. This hinge according to the prior art is also not bistable in the above-mentioned sense.

A similar hinge arrangement is described in WO-A-84 04 906. In that case, the strip-like connecting arms are flexible over their entire longitudinal dimension and do not include any substantially rigid trapezoidal connecting elements. In addition, these connecting arms are not located within the outer contour of the hinge parts, thus are esthetically unsatisfactory. That this hinge does not exhibit a good snapping effect is evident from what has been said above.

The object of the present invention is to provide a hinge arrangement, in particular for one-piece plastic closures, which while retaining the benefits of the abovementioned invention (EP 0 331 940) with regard to material stresses, in spite of extended opening angles of over 180°, has lower material loads and allows the spatial path of movement to be specifically controlled and there with [sic] greater degrees of freedom to be provided for the configuration of the hinge parts and their kinematics.

This object is achieved by a resilient hinge arrangement having a first hinge part, a second hinge part that assumes a plurality of stable pivoting positions with respect to said first hinge part with a dead center lying at least between two of said stable pivoting positions. The second hinge part is arranged to return from pivoting positions between the two stable pivoting positions, including a dead center, outside a dead center itself, in an elastically resilient manner into a nearest one of said stable pivoting positions. Two connecting arms are spaced a distance apart and have at flexurally rigid intermediate part between the coupling elements is delimited by two bending regions that are spaced apart and arranged at an angle to each other between the intermediate part and the coupling elements. Each of the two connecting arms is substantially stress free in an opened position and a closed position of the first hinge part relative to the second hinge part at a point at which the bending regions come closest to each other. And, each coupling element is arranged to execute a maximum elastic relieving movement in a region of the dead center upon pivoting movement of the second hinge part with respect to the first hinge part between the two stable pivoting positions including a dead center.

If the opening and closing movement of plastic closures without main-axis film hinge, as are described in the above-mentioned EP, is systematically observed, a complex spatial movement can be recognized. In spite of good bistable behavior, the aimed-for opening angles of toward 180° cannot be accomplished in a stress-free manner, and moreover a pronounced elongation of the connecting arms can be observed at the dead center, at the transition from one defined position to the other. Depending on the material, the closing angle is greater than 0° and the opening angle is rather less than 180° (about 160°). This means in long-term behavior that the material is constantly under stress outside the two defined positions with stress at a minimum, and on manipulation is subjected to pronounced elongations, which in the case of plastics can in the end lead to tears forming and, as a result, reduces the service life of such a closure.

If the process is closely observed, it is seen that the transition into the two stable positions is accompanied by an inversion process in the material, albeit slight. Such inversion processes are material deformations which proceed simultaneously in all three spatial directions (like a snap-action toy frog), which temporarily leads to an unstable position and thus clearly separates the two stable positions on both sides of the inversion. In addition to this there are the design measures in the form of preformed buckling locations, which contribute to controlling the movement process. It is evident that, in spite of an exact injection-molding technique by which the "control members" are impressed, the aim of controlling the forces entirely as one would desire is not achieved. Stray forces, some even into the plastic behavior of the material, bring about not only unsatisfactory mechanical properties, but in addition also the material-eroding phenomena, which of course are undesired.

Perhaps the reason for this is that during design there is generally the tendency to control and monitor as much as possible that [sic] and as a result a possible "cooperation" of the material, even leading to the objective, is not recognized and consequently is also not permitted. Instead of incorporating and utilizing such a cooperative aspect, one forces the entire planned movement process into (too) narrow constraints. This is where the idea of the invention comes in.

If the possibility of incorporating the inherent behavior of the material is given due regard, a whole series of such "cooperative sequences" can be utilized, doing so always together with an accompanying control of the movement process, assisting the sequence rather than hindering it too much. In the case of such embodiments, the material, in the preferred embodiments the plastic, is allowed to move where it has a tendency to move, and control measures are arranged only where a specific movement has been planned. This latitude between rigid direction and gentle guidance has the effect of avoiding unnecessary stresses.

In this way, the spatial movement sequence is controlled in a specific and unhindering manner by design means, and as a result greater degrees of freedom for the configuration of the hinge parts are created, as required by the specified object. The teaching according to the invention thereby overcomes previous limitations and, with permissible material loads, makes possible inter alia opening angles of up to 270° or even tristable hinges.

BRIEF DESCRIPTION OF THE DRAWINGS

Preferred embodiments of the present invention will now be described, taken together with the drawings, in which.

DETAILED DESCRIPTION OF PREFERRED EMBODIMENTS

Figure 1:
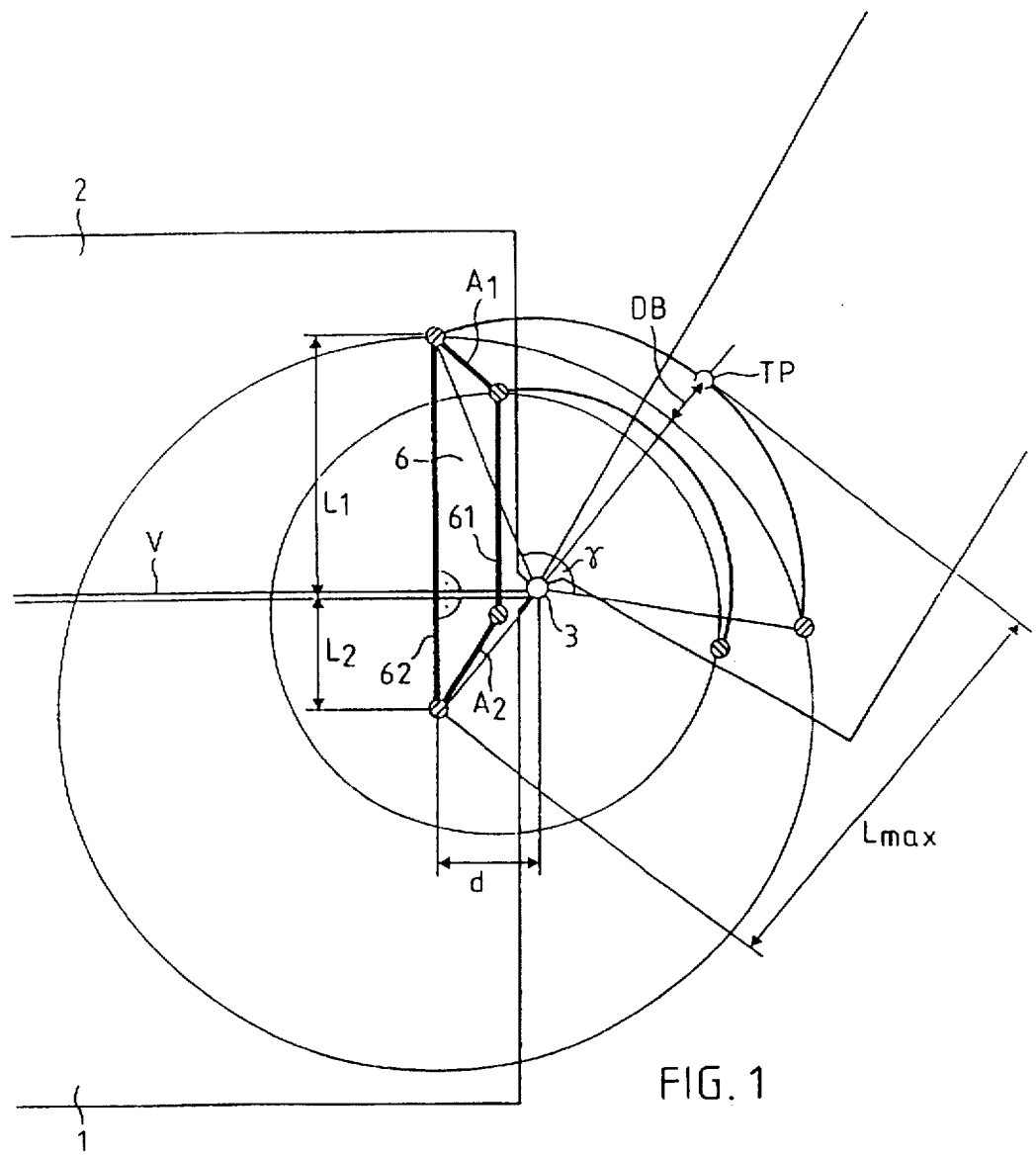
FIG. 1 shows the basic movement sequence and the geometry of a closure cap with joint axis offset.

FIG. 1 and the diagrams of FIGS. 2 through 5 provide basic observations for an understanding of the present invention.

In the following exemplary embodiments, the invention is explained in more detail by the examples of one-piece closures of plastic. The observations made and explanations given can of course be readily applied to other applications or materials, in particular to card-like materials. In the case of such plastic closures, the two hinge parts are formed by the closure body, or lower closure part, and the closure cover.

FIG. 1 shows part of a basically conventional closure with joint axis offset greatly enlarged, seen from the side. The main film hinge 3, which connects the closure body 1 and closure cover 2, stands perpendicular to the plane of the drawing. An intermediate element 61 (in the case of certain closures referred to as a taut band) is arranged here, and this is novel, asymmetrically with respect to the closure plane V. If the intermediate element 61 is understood as a "bundle of parallel fibers", each fiber between attachment locations $A_1$ and $A_2$ consists of an upper portion $L_1$ (closure portion) and a lower portion $L_2$ (closure body portion). Each fiber is a certain distance d from the main film hinge 3. These parameters $L_1$, $L_2$ and d are represented for the outer edge 62 of the intermediate element 61 in FIG. 1.

The elongation of the material (depending on the actual design, also compression) required by the joint axis offset principle reaches its maximum in the dead center region. Since the ratio $L_1/L_2$ may vary (compare the slope of the attachment locations $A_1$ and $A_2$), the elongation and the opening angle γ should be calculated individually for each fiber. However, this is not necessary for the basic considerations at this stage. For a simplified consideration of elongation and opening angle γ, the parameters of the portion lengths $L_1$, $L_2$ and of the axis offset d suffice. In practice, these parameters are generally:

$L_1$ maximum=$L_2$ maximum=about 3 mm (in the prior art always symmetrical) and d=about 1 mm.

These are customary dimensions of a closure cap of this type.

There follows a discussion with reference to FIGS. 2 to 5 of some diagrams which show details of loading cases after variation of the parameters discussed in connection with FIG. 1. To simplify the representations, $L_1$ is always normalized to the value 1. The two other parameters $L_2$ and d are thus specified in relation to $L_1$.

Figure 2:
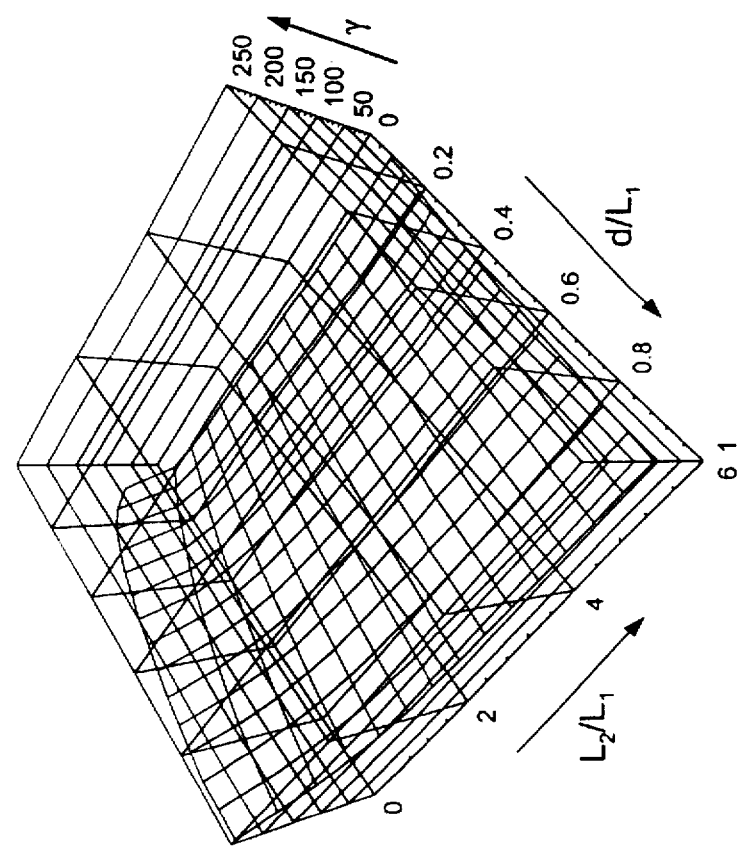

In the diagram of FIG. 2, the opening angle γ of the closure according to FIG. 1 is represented as a function of the parameters. $L_2$ varies from 0 $L_1$ to 6 $L_1$ and d varies from 0 $L_1$ to $L_1$. The function, represented as an area, shows that, with increasing joint axis offset d and with the smallest possible portion $L_2$, there theoretically results a maximum opening angle which, when $L_2/_L1$ [sic] tends toward 0 ($L_2$ tends toward zero), can theoretically be up to about 250°. Since, until now it has taken great efforts to achieve opening angles of much less than 180°, here there is still potential which according to teachings of the prior art, can in principle still be exploited. Principles with dimensionally elastic taut bands (cf. German patent application No. P 43 35 107.7) head in this direction.

Figure 3:
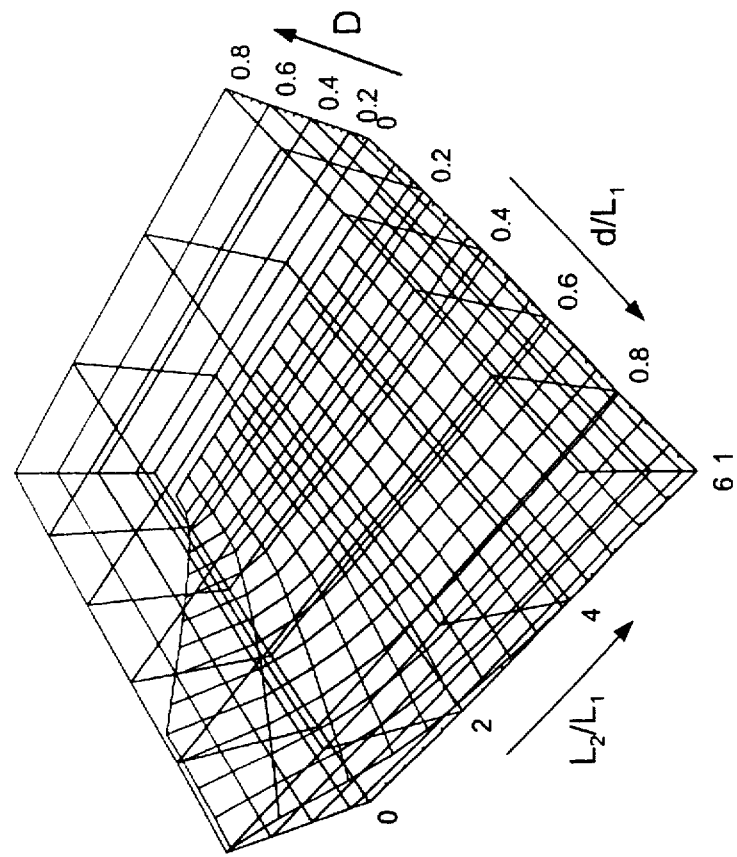
FIGS. 2 to 5 show in diagrams functions and also opening angles and elongations in dependence on design measures. The parameters are, as shown in FIG. 1, L$\theta$1, L$\theta$2 [sic] and d.
Figure 4:
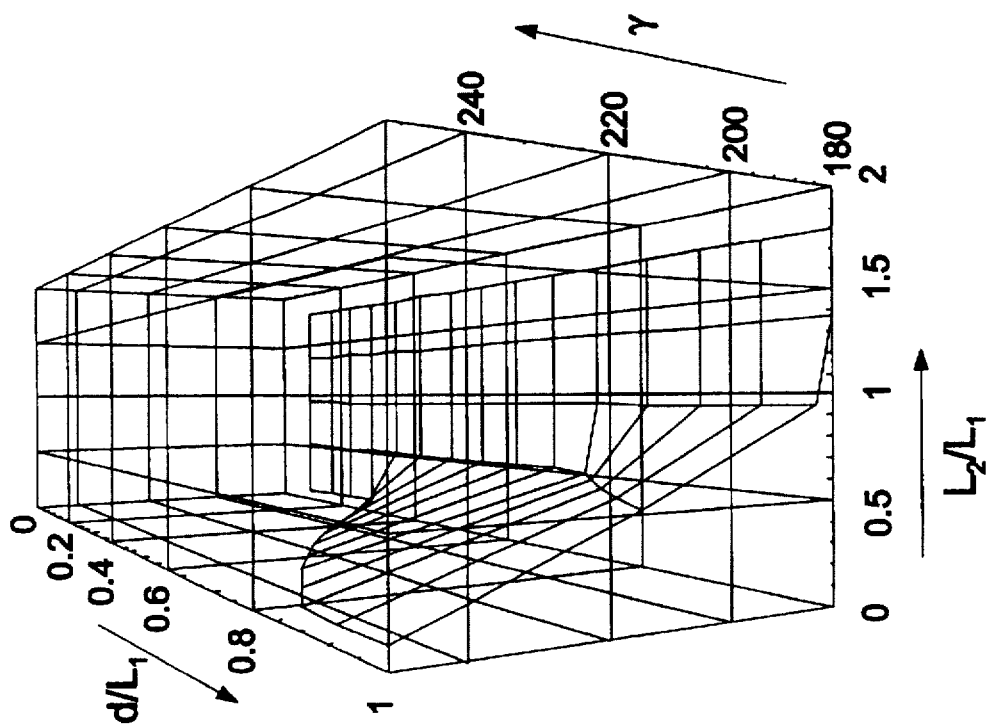

The diagram of FIG. 3 shows the fiber elongation at the dead center, that is at the same time the maximum fiber elongation. $L_2$ in turn varies from 0 to 6 $L_1$ and d varies from 0 to $L_1$. The function shows that, with the desired, large opening angle, i.e. with a small portion $L_2$, fiber elongations of 40% and more occur even when there is a small offset d. A comparison of the two diagrams shows that the maximum elongations occur in the very region where the desired opening angle would be optimal. If this region of interest is looked at more closely, the following is evident:

The diagram of FIG. 4 then shows the opening angle γ as a function of the parameters only for the range with opening angles of greater than 180°, i.e. the range from 180° to 250° is represented. $L_2$ varies from 0 to about 2 $L_1$ and d varies from 0 to $L_1$. The area of the resulting function shows very well here how narrow the design range becomes the greater the opening angle is to be and what high elongations result in this case, which is shown in the following diagram.

Figure 5:
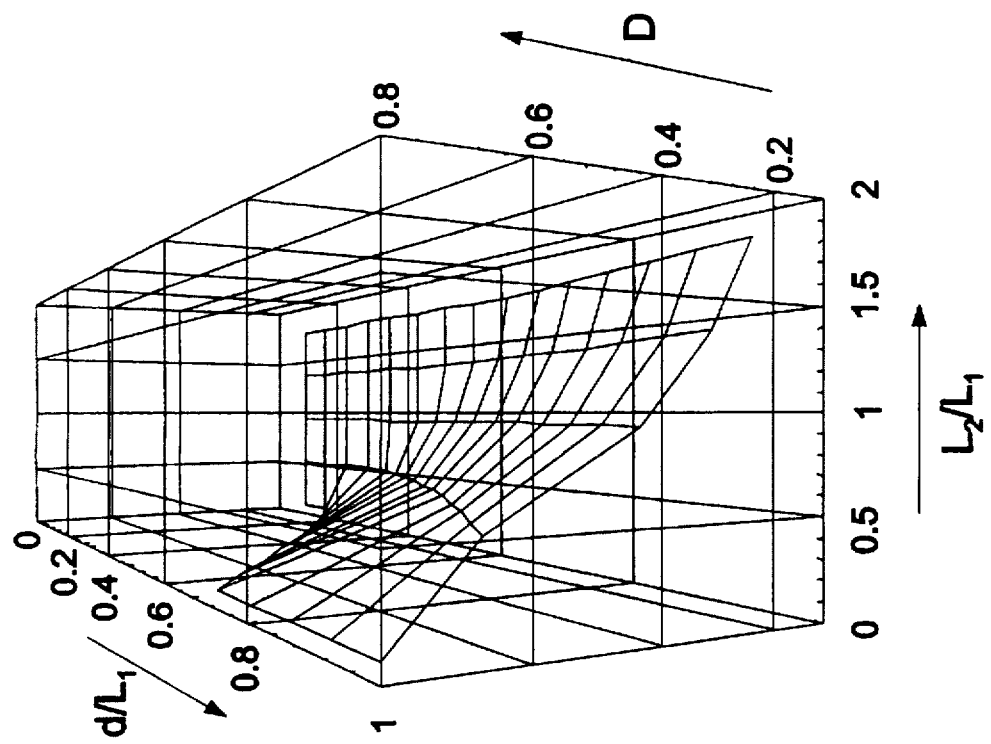

In the diagram of FIG. 5, the fiber elongation is shown as a function of $L_1$ and d, the same section of the range as in the diagram of FIG. 4 being represented. It is evident from this that elongations in the range of interest, i.e. γ>180°, lie over 30% and, for opening angles of 200° and more, are even up to almost 80%. This reveals that in fact only a very narrow (theoretical) range is accessible for conventional solutions. As can be seen, with an actually already impermissibly large elongation of 30%, a restricted opening angle of only 180° and less results. Thus, designs which lead to such elongations must be avoided, and attempts made to find a shaping in which not only design measures but also the cooperation of the material is utilized to achieve the objective. European patent specification EP 0 331 940 already shows a way by which one can begin to circumvent the restrictions of the conventional principle with joint axis offset. However, the solution according to EP 0 331 940 is strongly based on pure geometrical inversion processes, which allow the closure kinematics little freedom.

With the above knowledge, the problems involved are sufficiently apparent to appreciate where the barriers of the prior art are. Where and how they are overcome is shown on the basis of a first exemplary embodiment.

Figure 6:
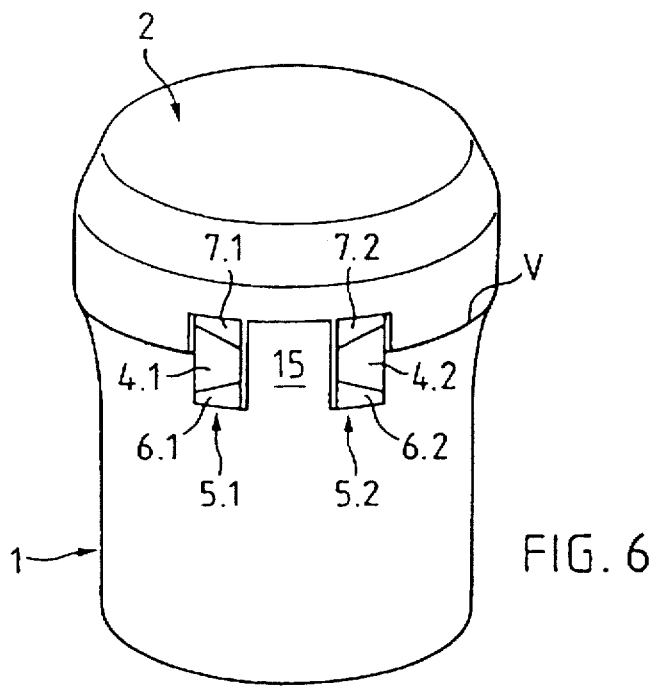
FIG. 6 shows in a basic representation a first exemplary embodiment of a one-piece plastic closure with connecting arms 5 arranged in parallel and asymmetry with respect to a plane with the closure closed.

FIG. 6 shows a plastic closure which can be produced in one piece by the injection-molding process and is, for example, injected-molded from polypropylene (PP). Suitable as plastics for the invention are generally polymers, in particular thermoplastics, with or without the customary additives and/or fillers, which can be molded into flexible tough films or sheets with thicknesses of typically 50–2000 μm and are flexurally resistant in this form. The closure has a closure body 1 and a closure cover 2, which form here the two hinge parts. The closure is represented in the closed state, i.e. the cover 2 lies against the closure body 1 in the region of the closing plane V. The closure body 1 and the cover 2 are connected just via two connecting arms 5.1 and 5.2, which are preferably arranged in niches. The hinge arrangement according to the invention can consequently be designed without any parts protruding beyond the closure contour. In contrast to known hinge arrangements with a main hinge and joint axis offset, there does not lie between the two connecting arms 5.1, 5.2 any additional hinge, which would connect the closure parts 1, 2. This allows the closure body 1 to be designed, for example, with an upwardly jutting web 15. The cover 2 has corresponding recesses, which in the closed state lie right up against the web 15. This web 15 brings about a guidance for the cover 2 and can be used specifically for the usually [sic] spout (concealed here) in the interior of the closure. It can easily be seen that the web 15 allows broad scope for design in order to bring about an exactly fitting and exactly guiding positioning of the cover 2. Particularly preferred are also upwardly convex forms, which make it impossible for the cover 2 to be tilted when closing. It can quite clearly be seen in this figure that the hinge arrangement is configured without a main film hinge. The present invention specifically avoids a connection of the two closure parts by a geometrical or physical main axis, which would restrict the cover movement in such a way that a circular-path movement would be enforced on the individual points of the hinge parts to be moved.

The two connecting arms 5.1 and 5.2 include in each case a lower coupling element 6.1, 6.2, which is connected to the closure body 1. and in each case an upper coupling element 7.1, 7.2, which in each case is connected to the cover 2. The upper and lower coupling elements 6.1, 6.2 and 7.1, 7.2 are each connected via a substantially flexurally rigid intermediate part 4.1, 4.2. According to the invention, the coupling elements 6, 7, like the intermediate parts 4, are configured such that they on the one hand keep torsional stresses of the connecting points between pivoting element and coupling element as low as possible, on the other hand bring about a specific, i.e. directed movement (control) of the closure parts in the opening and closing movement.

Figure 7:
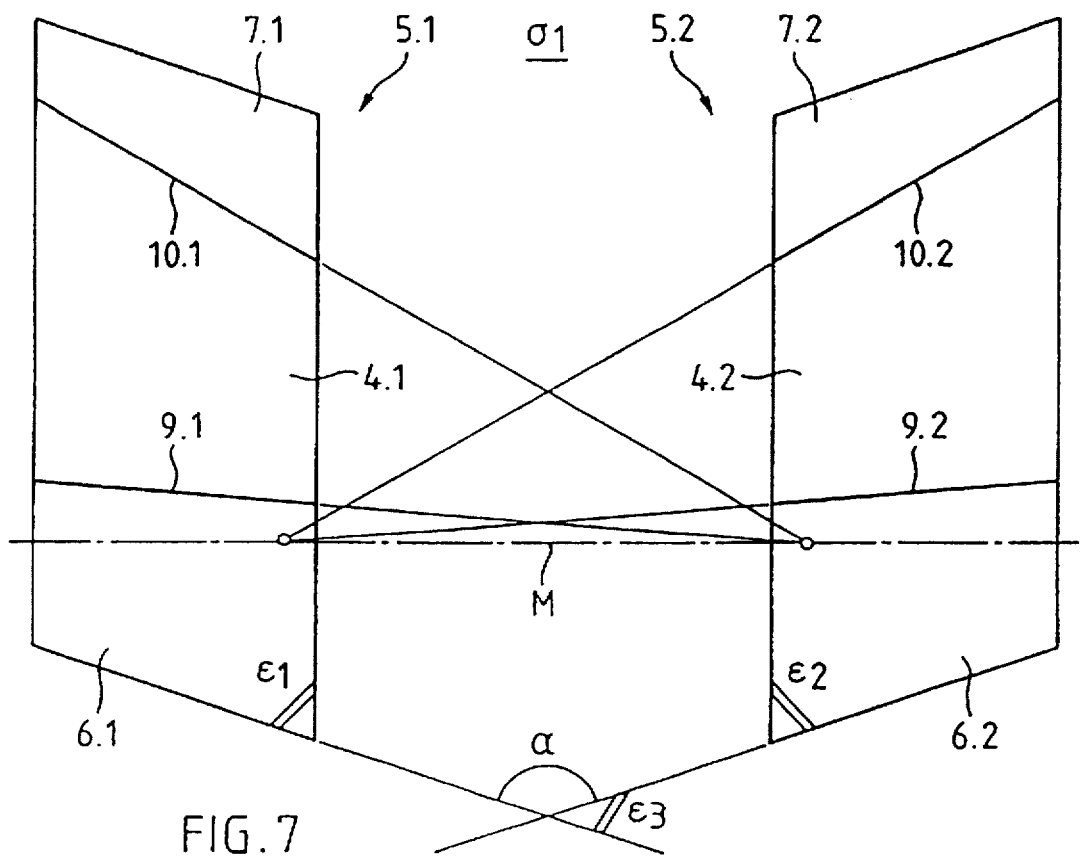
FIG. 7 shows an enlarged, diagrammatic representation of the connecting arms 5 between the two closure parts or hinge parts.

In FIG. 7, the two connecting arms 5.1, 5.2 are represented greatly enlarged. The two connecting arms are simplified here—disregarding their thickness and/or curvature—as two rectangles which are standing obliquely with respect to each other and lie in two planes $\epsilon_1$ and $\epsilon_2$ arranged at an angle $\alpha$ with respect to each other. In this exemplary embodiment, the two connecting arms 5.1, 5.2 are configured symmetrically with respect to a plane of symmetry $\sigma_1$, lying perpendicular to the plane of the drawing. On the other hand, here there is no symmetry with regard to the longitudinal direction of the connecting arms. The lower coupling element 6.1, 6.2 and the upper coupling element 7.1, 7.2 of each connecting arm have a different form. In contrast to the design discussed above according to EP 0 331 940, which works with triangular forms and symmetrical arrangements, here both the coupling elements 6, 7 and the intermediate parts 4 have a trapezoidal shape. The trapezoidal, preferably asymmetrical configuration then has the result that the movement processes are not confined. According to the invention, it is not endeavoured to restrict the closure kinematics to inversions, but rather, by the trapezoidal configuration, the material properties are deliberately incorporated and, in particular, used for absorbing torsional and flexural forces. Preferably provided between the coupling elements 6, 7 and the intermediate parts 4 are straight bending regions 9.1, 9.2 and 10.1, 10.2, respectively. These bending regions 9, 10 are preferably designed as joint locations (areal or linear bending regions), for example as joint-like thin locations, in the case of hinges of plastic in particular as film hinges; however, as explained, they form only a significant |sic| part of the control elements. The angle at which the bending regions (9, 10) are arranged to each other has a value that satisfies the formula:

$$\text{Tan}\frac{\Phi}{2} = \text{Cos}\frac{\omega}{2} \cdot \text{Cos}\frac{180° - \zeta}{2} + \text{Tan}\frac{\Phi}{2} \cdot \text{Sin}\frac{180° - \zeta}{2}$$

where $\Phi$ angle is the angle formed between the bending regions, $\omega$ is the angle which is formed by two lines standing perpendicular on the connecting arms (5), and $\zeta$ is the effective opening angle. The angle $\Phi$ has a value that corresponds to 2•ArcTan (Cos $\alpha$/2), where $\alpha$ is the angle enclosed by said connecting arms (5). The closing plane (cf. FIG. 1), not shown here, stands perpendicular to the plane of symmetry $\sigma_1$. A further plane, parallel to the closing plane, is marked here by $\epsilon_3$. According to the invention, the connecting arms are designed such that, while retaining the material properties, a specific deflecting movement of the connecting arms is brought about in the central region, so that excessive material stresses, in particular impermissible elongations, are reduced or avoided. The dissimilar configuration of the coupling elements 6, 7 results in a virtual pivot axis which is substantially at the level of the line M, which is defined by the points of intersection of the bending regions 9.1, 10.1 and 9.2, 10.2, respectively. It should be stressed here that this virtual pivot axis must not be confused with a geometrical or even physical main axis, since this virtual pivot axis moves continuously during the complex three-dimensional movement process. This deflecting and relieving principle is to be explained below on the basis of various exemplary embodiments of the invention.

The coupling elements 6 and 7, the separating bending regions 9 and 10 and the intermediate parts 4, arranged in between, offer a great variation of structural configuration. Depending on position, length and angle, they together form "movement units", which in spite of a large opening angle and defined opened position and closed position have only little stress and consequently little elongation. When mention is made henceforth of elongation, it is assumed that the statements also relate of course to corresponding compressions, which occur depending on the structural design of hinges. The cooperation of the material is to be regarded as constituted by the fact that elasticities are utilized in a number of directions one after the other, such as step by step, in conjunction with the movement of the two connecting arms. The bending regions 9, 10 assist the defined movement of the hinge arrangement and concentrate inversion processes substantially on these regions. The other parts of the connecting arms 5 are inverted or bent around only slightly or not at all. The trapezoidal configuring variations according to the invention lead to possibilities and kinematics which open up new scope in comparison with known solutions. The teaching according to the invention makes possible, inter alia, opening angles of up to 270° or even closures having a plurality of stable positions, as is explained further below. This is in contrast to the known taut bands or the design according to EP 0 331 940 with triangular elements and two joint lines (folding lines). The invention consequently makes possible a plurality of stable pivoting positions of a first hinge part with respect to a second hinge part, there generally being a dead center in each case between two such stable pivoting positions. For the purposes of the invention, consequently it is not only endeavoured to achieve that two (or more) stable pivoting positions are accomplished, but that the hinge parts always return resiliently from each pivoting positions |sic| from such dead centers provided in this way into one of the stable pivoting positions. In other words, not only extra stability is sought, but the combination of extra stability with a spring or snapping effect.

Figure 8:
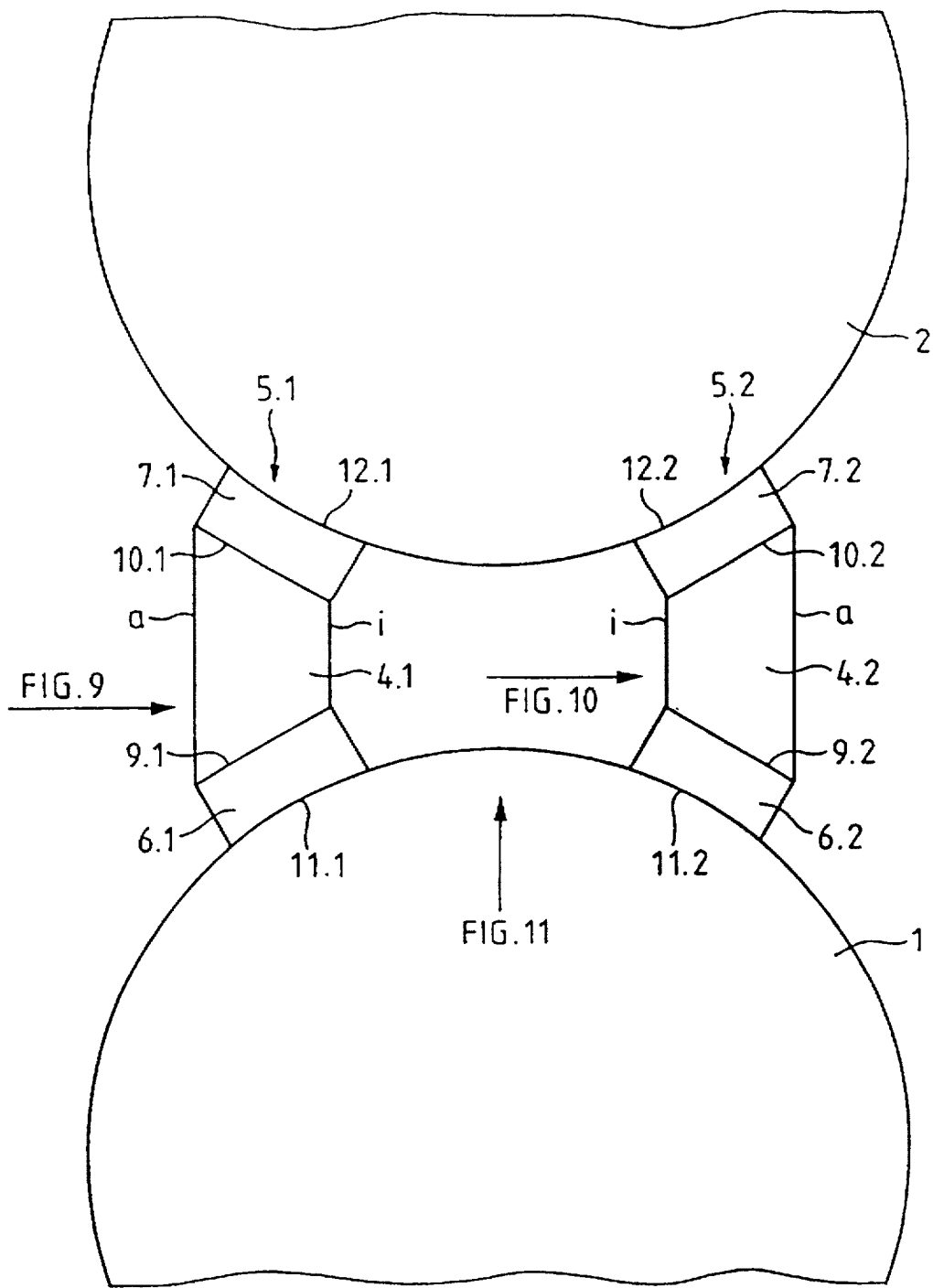
FIG. 8 shows the exemplary embodiment in the swung-open state. The view is looking into the interior of the cover and of the container.

FIG. 8 shows an exemplary embodiment in a 180° swung-open and largely stress-free state. The view is looking into the interior of the cover and of the container. Closure body 1 and closure cover 2 are connected to each other via the two connecting arms 5.1 and 5.2. For closing, the closure cover 2 would then be swung out from the plane of the paper. The two connecting arms protrude out of the plane of the paper like two arches of a bridge. Depending on the length of the coupling elements 6, 7, which do not have to be equally long, and depending on the angular position of the joint locations or bending regions 9, 10 and depending on the length of the connecting pieces 4., the hinge behaves differently during opening and closing. Also indicated are additional bending regions 11.1, 11.2, 12.1, 12.2, which make possible here the wide, stress-free opening state.

Figure 9:
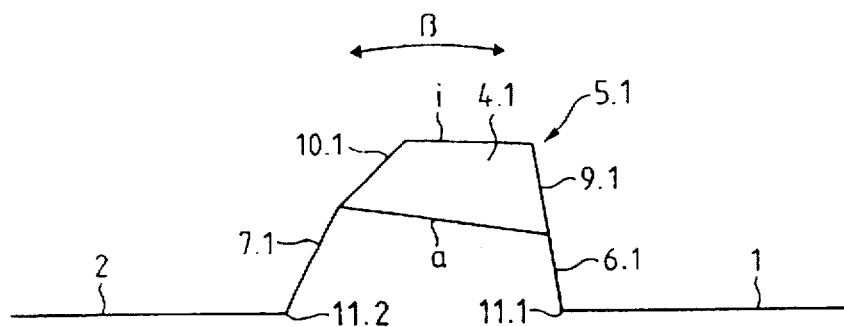
FIG. 9 shows the one connecting arm 5.1 of the swung-open hinge from the side indicated in FIG. 8.
Figure 10:
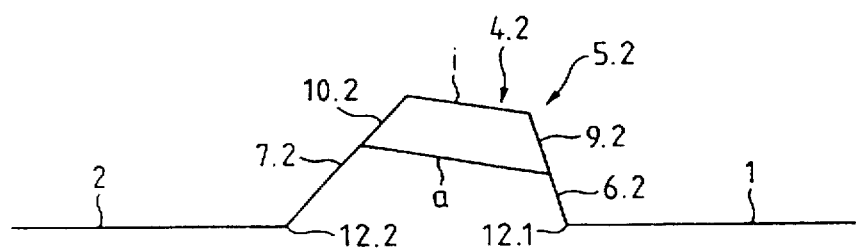
FIG. 10 shows the other connecting arm 5.2 of the swung-open hinge from the side indicated in FIG. 8.
Figure 11:
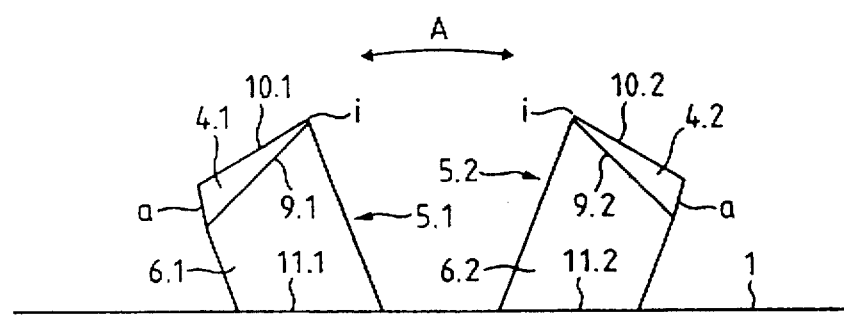
FIG. 11 shows the two connecting arms 5.1 and 5.2 of the swung-open hinge from the side indicated in FIG. 8.

FIG. 9 shows the connecting arm 5.1, which is raised up in the manner of an arch of a bridge and whose trapezoidal intermediate part 4.1 is inclined toward the viewer such that he sees the same surface as in FIG. 8, while the other connecting arm 5.2 faces the viewer in FIG. 10 such that he sees the lower side of the intermediate part 4.2, inclined toward him. With the arc $\beta$, the closing and opening movement is indicated. FIG. 11 shows the two connecting arms 5, as they face the viewer when he looks through between them. It is evident that, owing to the bending regions 11.1, 11.2 (and 12.1, 12.2, respectively) running obliquely with respect to each other, they are laterally inclined with respect to each other. A double-headed arrow, denoted by A, is intended to indicate a movement transversely with respect to the opening and closing movement denoted by β in FIG. 9. This movement denoted by A could best be described as a (here sideway-acting) dead-center-elongation/relieving movement. While the taut bands according to the prior art are only tensioned and act like a spring acting in one direction, the connecting arms 5.1 and 5.2 perform a mutually interactive relieving movement, which can be controlled within broad limits by the positional design of the bending regions 9 and 10 and by the linear dimensioning of the coupling locations 6 and 7 and/or by means of additional bending regions 11, 12. The invention consequently provides special elongation-relieving means for the coupling elements (or at their transitions), which bring about the required relieving movement.

By proceeding in this way, one obtains opening angles over 200° with stress-free end positions and elongations under 10%, only the counteracting force of the bent film hinges of the connecting locations has to be applied, elastic tension or compression in the connecting arms is of minor significance. By asymmetrical configuration of the connecting arms 5 (asymmetry with respect to the plane $\sigma_1$, cf. FIG. 7), offsets of the pivoting movement are also possible, so that the closure cap swings away obliquely to the side. A special advantage of the invention is that the degree of the relieving movement, and as a result the snapping effect, can be influenced. Since the geometry of the closure parts 1, 2 has no influence on this, selective, predictable closure kinematics and a desired spring effect are achieved.

Figure 12:
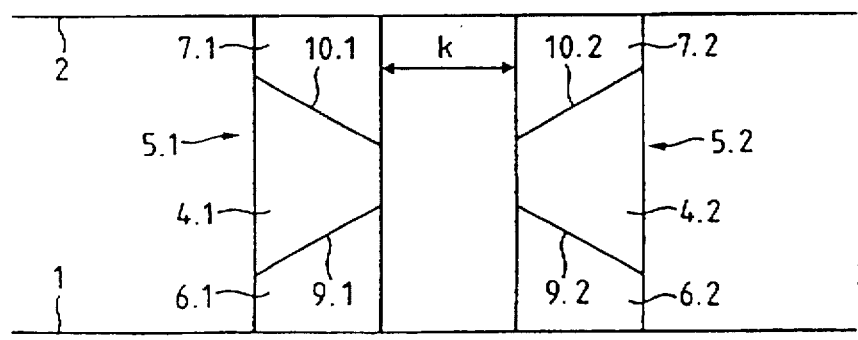
FIG. 12 shows the exemplary embodiment of FIG. 8 in the swung-closed state. The view is looking from inside at the hinge, not from the rear as in FIG. 6.

FIG. 12 shows the exemplary embodiment of FIG. 8 in the swung-closed state. The view is looking from the inside toward the hinge, not from the rear as in FIG. 6. In spite of the complex spatial movements mentioned in FIGS. 8 to 11, the two connecting arms 5.1 and 5.2 are, in the closed state here, just straight connections at the distance k apart, which can consequently be arranged like two customary taut bands. On swinging open, these connecting arms snap without great stress, but with a distinct snapping effect, into the bridge arch form, as shown in FIGS. 9 and 10, the compensating movement according to FIG. 11 laterally diverting the excess stress in the dead center during the opening and closing movement. This action is specifically supported by the mentioned additional bending regions 11, 12.

Figure 13:
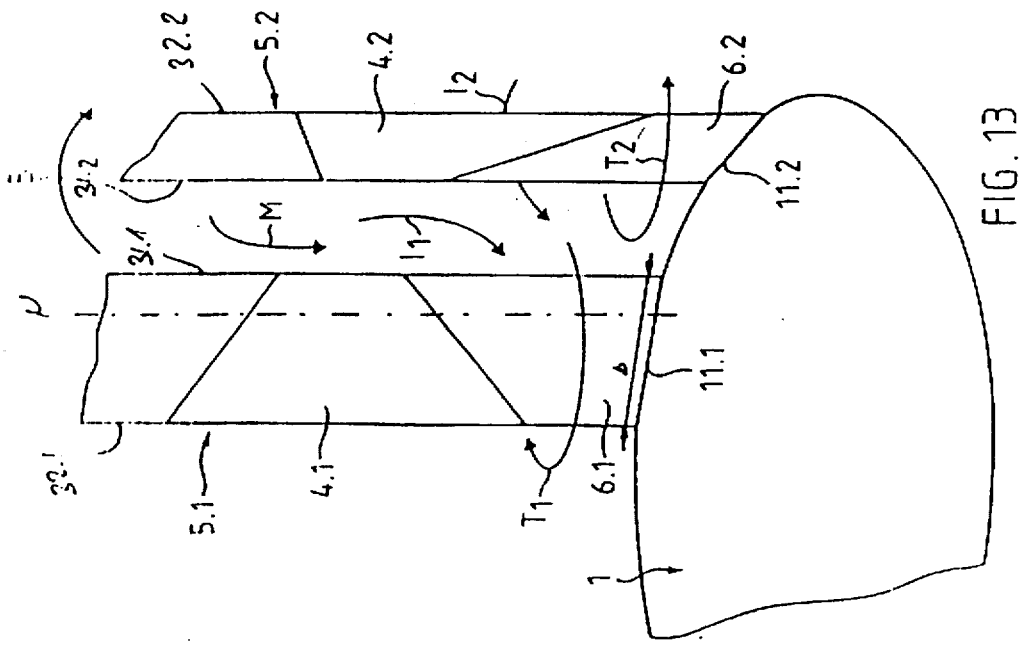
FIG. 13 shows the relieving movement according to the invention on the basis of a diagrammatically represented exemplary embodiment.

With reference to FIG. 13, the mentioned dead-center-elongation/relieving movement is to be explained in more detail. Attached to a diagrammatically indicated lower closure part 1 are two connecting arms 5.1, 5.2, which are drawn here likewise only diagrammatically in two-dimensional form. For understanding the relieving movement, the elongation-relieving elements, here the two coupling elements 6.1, 6.2, are of significance. If the connecting arms 5.1, 5.2 are pivoted from the position represented here (closure closed) outward in the direction of the arrow B, there exists in the central region M at the two connecting arms a stress-induced compressive action, which counteracts the elongation occurring on the outer edges of the connecting arms. The intermediate parts 4.1, 4.2, which are flexurally rigid in comparison with the coupling elements 6, 7, consequently have in the central region M the tendency to deviate toward the interior of the closure in the direction of the arrows $I_1$ and $I_2$. If this movement is then prevented, as is the case in particular with conventional closures with joint axis offset, elongations which lie in the dimensions explained with reference to FIGS. 2–5 are produced in particular on the outer edges of the intermediate parts 4.1, 4.2, or the connecting arms 5.1, 5.2.

According to the invention, it is then provided that the coupling elements 6.1, 6.2 (or the upper coupling elements 7.1, 7.2 not shown in this figure) execute a relieving movement. As can be seen from FIG. 13, there occur not only forces acting toward the closure axis, in the direction of the arrows $I_1$, $I_2$, but also torsional forces in the direction of the arrows $T_1$ and $T_2$. The general state of stress of the arrangement comprises a superimposing of tensile, flexural and torsional stresses. The invention has the effect that, by means of a relieving movement which absorbs both torsional and radially acting forces in the central region M, the harmful elongational forces, acting in the longitudinal direction of the connecting arms 5.1, 5.2, are reduced or compensated. The means required for the relieving movement are formed by the additional bending regions 11, 12 and/or the configuration of the coupling elements 6.1, 6.2 (material cooperation, geometry). In this way it is achieved that, in the relative pivoting of a second hinge part with respect to the first hinge part between two stable pivoting positions including a dead center, each coupling element executes an elastic relieving movement in the region of the maximum dead center.

If the elongation-relieving elements are designed such that the material stresses are largely eliminated by the relieving movement, the spring forces are reduced and the snapping effect is lessened. In the central region M, the compressive edges 31.1, 31.2 of the connecting arms 5.1, 5.2 are under pressure. On the other hand, the outer tensile edges 32.1, 32.2 are subjected to tensile stress. The configuration according to the invention of the hinge arrangement then has the result that during the opening and closing movements there is in the inner region of the connecting arms 5 a neutral region N (no or absolutely minimal compressive and tensile forces), which is represented here only for the connecting arm 5.1. As can be seen from FIG. 13, this region lies far in the direction toward the center of the connecting arm 5.1. The coupling elements are preferably configured such that the neutral region N lies in the central third of the connecting arms 5. As a result, a balanced stress profile is accomplished over the width b of the connecting arms and, as described, harmful material loads are prevented. Preferably, the elongation-relieving elements, for example the additional bending regions 11, 12, are consequently designed in dependence on material and geometry such that the material elongations lie in the optimized regions, so that the snapping effect is distinctly perceptible, but no excess stress occurs.

The following figures show some preferred structural examples, in each case represented from the viewpoint of FIG. 12. They originate from a methodical variety of variations, which have different loading results and force flows and thus show in each case different properties, which can be used according to requirements.

Figure 14:
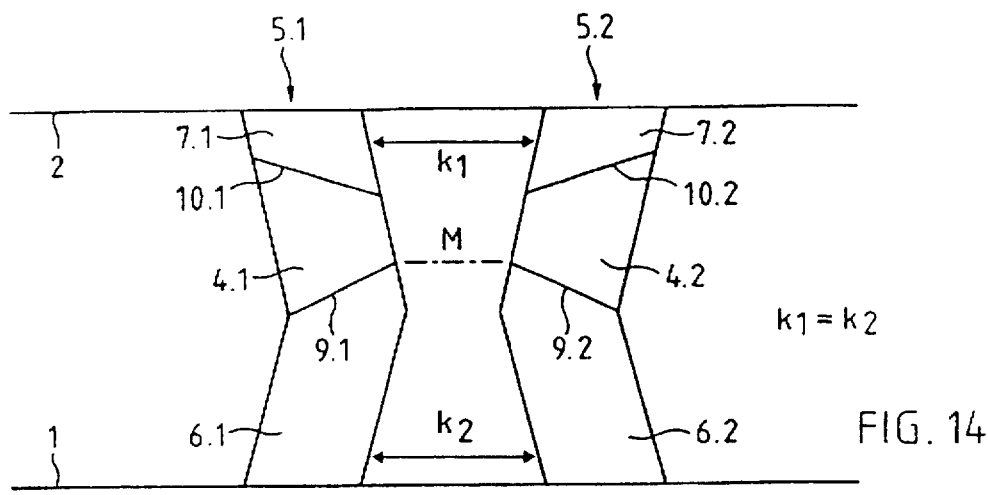
FIG. 14 to FIG. 19 show further embodiments of the connecting arms 5.1 and 5.2 from the view as in FIG. 12.

FIG. 14 shows an embodiment with inwardly angled connecting arms 5.1, 5.2. The distances $k_1$, $k_2$ apart of the attachment locations on the two elements 1 and 2 are equal here. The bending regions 9, 10 are arranged on one side of the kink. On swinging open and closed, the cover part 1 pivots substantially at the level M between the two connecting arms and adjusts in a stress-free manner to an opening angle of greater than 200°. In addition, it can be observed that the stress-compensating movement becomes particularly great, which is of advantage with certain materials. In this embodiment, additional bending regions 10.1, 10.2, 11.1, 11.2 are not needed, since the obliquely arranged coupling elements 6.1, 6.2, 7.1, 7.2 have good torsional and flexural properties and thus avoid excessive material stresses.

Figure 15:
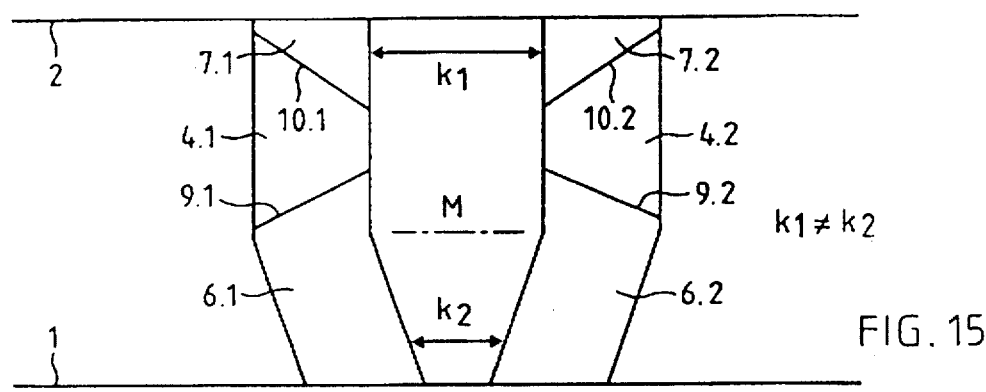

FIG. 15 shows an embodiment with outwardly angled connecting arms. The distances $k_1$, $k_2$ apart of the attachment locations on the two elements 1 and 2 are unequal. The bending regions 9, 10 are in turn arranged on one side of the kink. On swinging open and closed, the cover part 1 pivots with an adequately great stress-compensating movement at the level M between the two connecting arms and adjusts in a substantially stress-free manner to an opening angle of greater than 200°.

Figure 16:
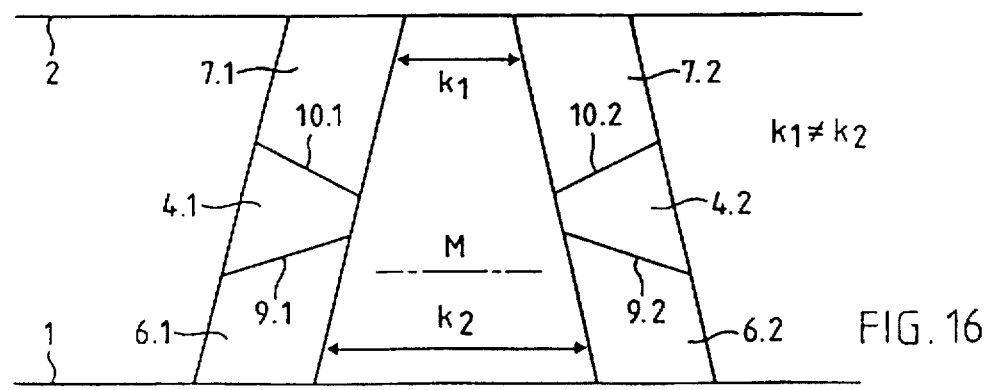

FIG. 16 shows an embodiment with outwardly disposed connecting arms. The distances $k_1$, $k_2$ apart of the attachment locations on the two elements 1 and 2 are unequal, $k_1 > k_2$. On swinging open and closed, the cover part 1 pivots at the level M between the two connecting arms and adjusts to an opening angle of approximately 180°. The stress-compensating movement is less than in the case of the above embodiments, but adequate enough. In the converse case, $k_1 < k_2$, not shown, the cover part 1 pivots with an opening angle of approximately 180° into a position underneath the base part 2.

Figure 17:
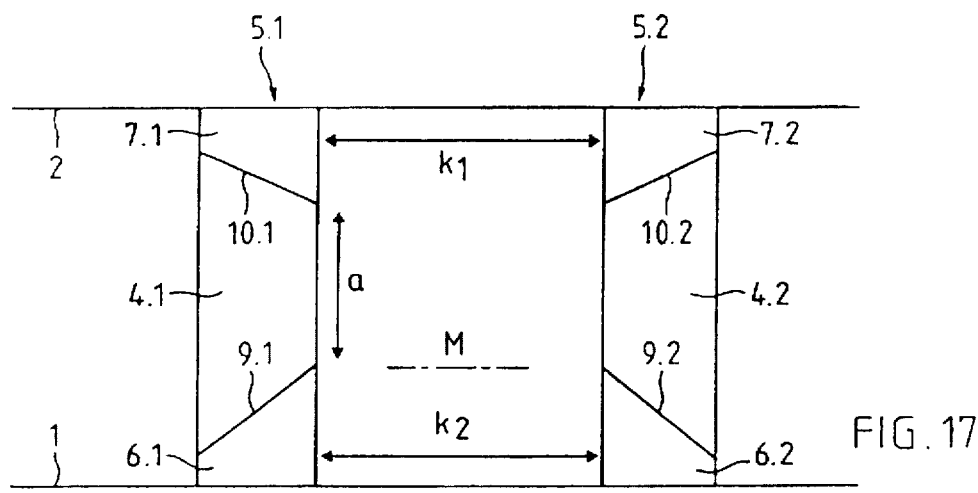

FIG. 17 shows an embodiment with connecting arms disposed in parallel. The distances $k_1$, $k_2$ apart of the attachment locations on the two elements 1 and 2 are equal. The bending regions 9, 10 are arranged relatively far apart, or the coupling elements 6.1, 6.2, 7.1, 7.2 have only a small length (virtually triangular). On swinging open and closed, the cover part 1 pivots with a distinct snapping effect into the level M and adjusts to an opening angle of approximately 180°. In addition, it can be observed that the stress-compensating movement is small, and the bending regions 9, 10 remain slightly under stress. This may be just right for certain applications, to be specific wherever the cover part is, for example, not to rock during movement. A great distance a between the bending regions 9, 10 is particularly advantageous also whenever the hinge parts are to be spaced apart in a 180° open position. This of course also makes it possible to influence the distance required for [lacuna] injection mold in the injection position.

Figure 18:
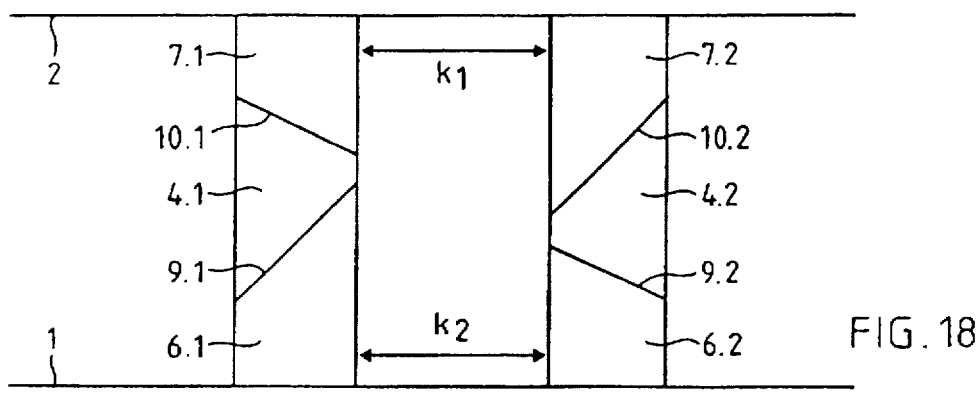

FIG. 18 shows an embodiment with connecting arms disposed in parallel ($k_1 = k_2$) and with an asymmetrical configuration of the coupling elements 6, 7, or asymmetrical positional design of the bending regions 9, 10 (different inclination of the connections (cf. asymmetry with respect to $\sigma_1$, cf. FIG. 7), to be precise different angles at a connecting arm and different heights of the trapezoids with respect to the connecting arms. On swinging open and closed, the cover part 1 pivots with a distinct snapping effect into a position at a slant with respect to the base part. The movement takes place about an axis inclined with respect to the closure plane (cf. FIG. 1). With this embodiment, it is intended only to show the variety and the possibilities which the inventive solution offers.

All the embodiments of FIGS. 14 to 18 show variants of the basic form with two mutually inclined connecting locations or bending regions 9, 10, in order to obtain the desired snapping effect without excessively elongating the material. However, the opening angle can be additionally and significantly enlarged by the invention if one or more connecting locations or bending regions 11.1, 11.2, 12.1, 12.2 are provided. Depending on the material and/or design of the parts to be connected (cover/vessel), the attachment locations or coupling elements 6, 7 are particularly rigidly designed, so that the "opening cooperation" is virtually no longer applicable. It is then advantageous to bring in one or two such further bending regions or hinge location(s). These may have just a bending function or else also have an additional snapping function.

Figure 19:
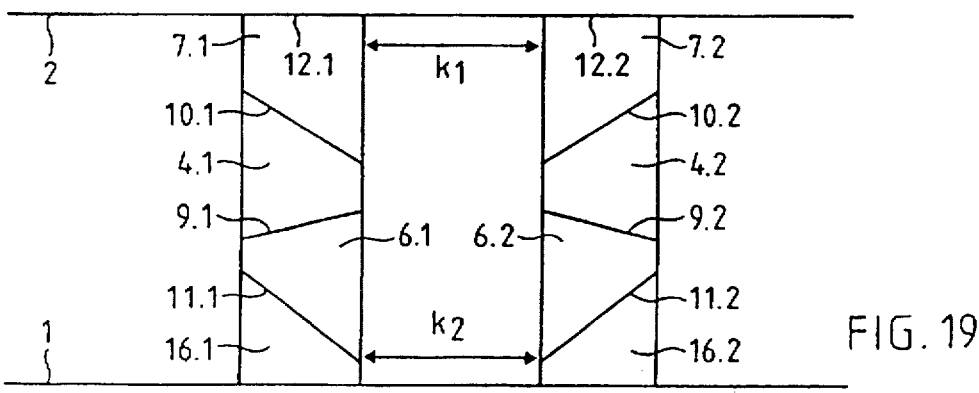

FIG. 19 shows a special embodiment with an additional, inclined bending region in the vicinity of one hinge part, here the closure body 1. The distances $k\theta1$, $k\theta2$ [sic] apart of the attachment locations on the two elements 1 and 2 are equal. The bending regions 9, 10 are arranged in a way analogous to that in the case of other embodiments. The additional bending region is formed by linear bending regions 11.1, 11.2, which connect the coupling elements 6.1, 6.2 to attachments 16.1, 16.2 of the closure body 1. Furthermore, additional bending regions 12.1, 12.2 are provided, which connect the upper coupling elements 7.1, 7.2 to the closure cover 2. The attachments 16.1, 16.2 are rigidly connected to the closure body 1. The additional bending regions 11.1, 11.2 are inclined such that they can execute the relieving movement A explained with respect to FIG. 11. The arrangement of the connections or bending regions 9, 10, 11 may be compared to the form of a Z, i.e. the lines have alternately a positive or negative inclination with respect to the edges of the connecting arms 5. If the slope of the additional bending regions 11.1, 11.2 is chosen to be relatively great (>45°, as shown for example in FIG. 19), the hinge has an additional locking position. On swinging open and closed, the closure cover 2 firstly pivots open about the bending regions 9, 10 with a snapping effect, in a way similar to that in the case of the examples explained, and adjusts to a first opening angle of about 180°. If the cover is then further actuated by applying additional manual force, a second snapping effect occurs substantially about the bending regions 11.1, 11.2 and brings the closure cover into a second opening position of about 270°. The invention consequently makes possible three stable positions of the closure cover. Consequently, the invention allows, in an entirely novel way, a tristable or (in the case of additional bending regions) multi-stable hinge connections, which has hitherto not been made possible by any known hinge according to the prior art.

If the connecting arms are connected by only slightly inclined or horizontal additional bending regions 11.1, 11.2 via attachments 16.1, 16.2 or directly at the transitions to the hinge parts, a bistable opening movement is produced, in which the relief takes place by inclination of the coupling elements 6.1, 6.2, 7.1, 7.2 to the outside (cf. for example FIG. 10). As evidence, in the case of embodiments with attachments 16.1, 16.2, the stress-compensating movement is not adversely affected and the bending regions 9, 10, 11 are largely stress-free.

The inclination of the bending regions 9, 10, or additional bending regions 11, 12, is used specifically according to the invention in order to influence the movement sequence in the sense of a gentle control and, as a result, to obtain advantageous opening movements. At the same time, the mutual arrangement of the connecting arms 5 is to be taken into consideration. Since the hinge movement depends both on the inclination of the bending regions and on the mutual arrangement of the connecting arms 5, these parameters are preferably coordinated.

The meaning of these parameters is to be explained with reference to FIG. 20. This figure shows, again diagrammatically, two connecting arms 5.1, 5.2, arranged on a round closure body 1. The connecting arms represented here as flat (without thickness) together enclose an angle α. Two lines, perpendicular to the connecting arms, through the axis of the closure body enclose an angle $\omega = 360° - \alpha$. The bending regions 9.1, 10.1, and 9.2, 10.2, in each case enclose an angle Φ. It can easily be shown that the theoretically accomplished opening angle is dependent on the mutual relationship of the two angles |lacuna| and Φ. By means of trigonomic calculation, it can be shown that, with coupling elements 6, 7 arranged rigidly perpendicular to the closure parts, the following condition has to be satisfied to achieve a theoretical opening angle of 180° (disregarding material influences): tan Φ/2=cos α/2=cos (180−ω)/2. Consequently, for ω=90°, for example, an angle Φ=70.5° would be required. As already explained further above, a much larger opening angle can be achieved if there are provided additional bending regions 11, 12, which allow a stress-free state in the opened position.

As already explained, flexural and torsional forces occur in an opening movement in the direction of the arrow B. Relevant here are the torsional forces $F_{T1}$ and $F_{T2}$ and also the flexural force $F_{B1}$ on the lower coupling elements 6.1, 6.2 and also the torsional and flexural forces $F_{T3}$, $F_{T4}$, $F_{B1}$ on the upper coupling elements 7.1, 7.2. These forces are equal if the coupling elements 6, 7 have a corresponding form, i.e. the bending regions 9.1, 10.1 and 9.2, 10.2 are arranged symmetrically at the same angle $\lambda_1$ and $\lambda_2$ on the connecting arms 5.1, 5.2. As can be seen from FIG. 20, here the lower bending regions 9.1, 9.2 preferably have a larger angle $\lambda_1$ than the upper bending regions 10.1, 10.2. This has the result that the corresponding forces $F_{T1}$, $F_{T2}$ and $F_{B1}$, which act on the lower coupling elements 6.1, 6.2, are less than the corresponding forces $F_{T3}$, $F_{T4}$ and $F_{B2}$, which occur in the case of the upper coupling elements 7.1, 7.2. As a consequence, in an opening process, a simultaneous bending around in the bending regions 9, 10 is not achieved, but instead the connecting arms 5.1, 5.2 move firstly about the bending regions 9.1, 9.2 and only thereafter about the bending regions 10.1, 10.2. This is used according to the invention specifically in order to influence the movement sequence during the opening and closing process. In the case of the exemplary embodiment according to FIG. 20, it is achieved, for example, that the upper closure cover (not shown here) firstly executes a pivoting movement outward substantially at the level of the marking $M_1$ and, only after a delay, an additional pivoting movement in the region of the marking $M_2$. The inventive idea of controlling the movement sequence while at the same time reducing the elongational forces by cooperation of material properties becomes particularly clear from FIG. 20.

The choice of the angles $\lambda_1$ and $\lambda_2$ and also the distance a apart of the bending regions 9, 10 leaves open a broad control range for the kinematics of the hinge. Particularly advantageous are arrangements of the bending regions 9, 10 in which the axes of the diagonally opposite movement regions are as slanted as possible. In particular, the diagonally opposite bending regions 9.1 and 10.2, or the bending regions 9.2 and 10.1, are to be as far as possible non-parallel and as far as possible offset in the axial direction. This can achieve the effect that the overall behavior of the hinge is as stable as possible against twistings of the closure parts (actually undesired torsional forces).

Figure 21A:
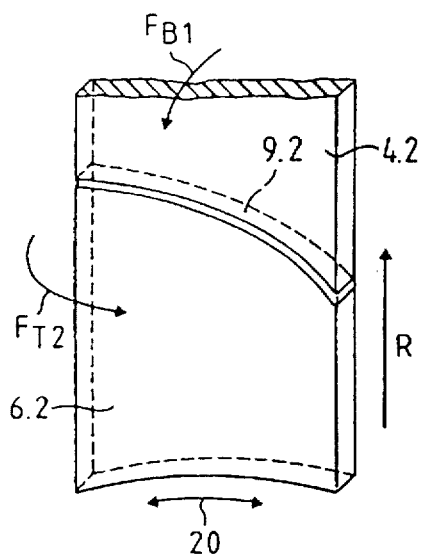
FIGS. 21a–21d show various embodiments of coupling elements 6, 7.

With reference to FIGS. 21a–21d, additional possibilities for influencing the movement processes and further examples of the arrangement of the functional elements are described. The material cooperation according to the invention can be assisted or influenced by additional structural measures. FIG. 21a shows a lower coupling element 6.2, which has a slight convexity 20 transversely with respect to the longitudinal direction R. In a preferred design, this convexity corresponds to the local curvature of the closure part. The bending region 9.2, arranged obliquely with respect to the longitudinal direction, preferably has a straight form, but for special designs may be curved or exhibit a nonlinear path. The intermediate part 4.2 here likewise has a convexity 20 corresponding to the coupling element 6.2. If the connection 9.2 is designed as a film hinge, the movement behavior is |sic| differs in comparison with the embodiments described further above essentially only on account of the convexity of the coupling element 6.2. The convexity 20 has the result that the coupling element experiences a stiffening with respect to flexural forces $F_{B1}$. With respect to torsional forces $F_{T2}$, however, there is a lower resistance, so that the desired elongation relief is accomplished by a pivoting movement substantially in the direction of the arrow $F_{T2}$. If the connection 9.2 is accomplished by an elastic material connection, the movement process is additionally superposed by a three-dimensional inversion process of the convex parts 6.2, 4.2. The snapping effect can thereby be additionally increased.

Figure 21B:
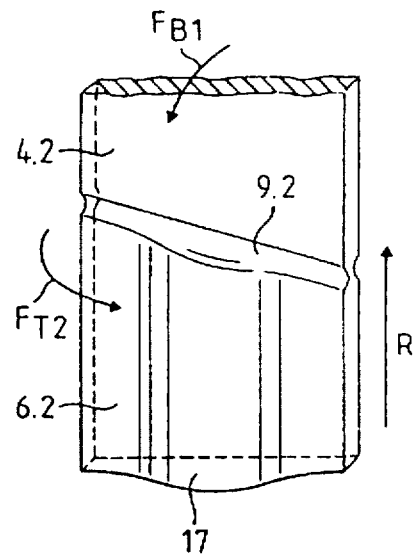

FIG. 21b shows a coupling element 6.2, which is connected via a film hinge 9.2 to the intermediate part 4.2. The coupling element has here a straight, flat form, but is reinforced in the central region by a rib 17 running in the longitudinal direction R. This rib 17 leads to a reinforcement of the material and to a corresponding stiffening of the coupling element 6.2 in the longitudinal direction. In a corresponding way, a stiffening can also be achieved in the longitudinal direction by a plurality of narrower ribs. In an analogous way, ribs or material reinforcements which bring about a stiffening transversely with respect to the longitudinal direction R may be provided. In this case, torsional movements of the coupling element 6.2 transversely with respect to the longitudinal direction R are largely suppressed and the coupling element 6.2 will execute in particular flexural movements in the direction of the arrow $F_{B1}$. It goes without saying that such stiffenings may be used in combination with additional bending regions 11, 12 (cf. for example FIG. 19).

Figure 21C:
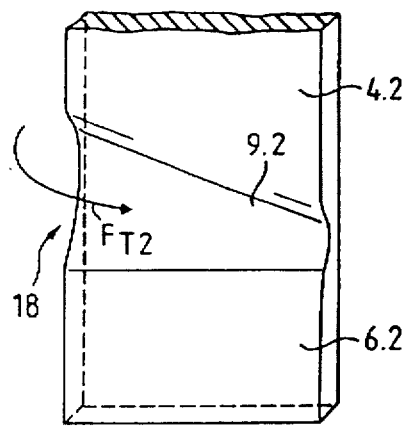

FIG. 21c shows an exemplary embodiment in which the coupling element 6.2 is connected via a film hinge 9.2 to the intermediate part 4.2. In order to be able to absorb torsional and flexural forces via the coupling element 6.2, a thinning of the material is provided here in the upper region 18 of the coupling element. In order that the coupling element 6.2 has adequate overall strength, the material thinning is preferably not provided over the entire width of the coupling element but only where the torsional and flexural forces are greatest. As a result, the forces and moments required for the elongation relief are specifically absorbed by certain regions of the coupling element. The bending region 9.2 is in this case to be shaped such that only a defined region is used for the actual bending around of the connecting arm. This is achieved by the transition from the material thinning in the region 18 to the connection 9.2 having a sudden change in material thickness.

Figure 21D:
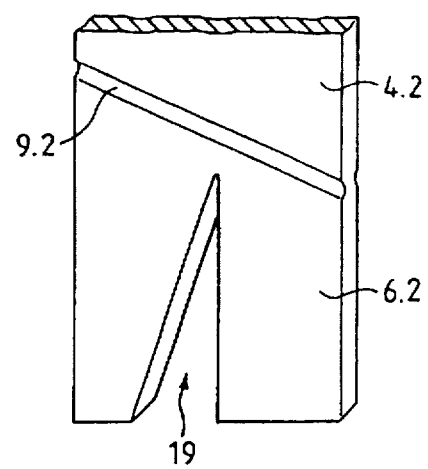

FIG. 21d finally shows an exemplary embodiment in which the coupling element 6.2 has a material clearance 19, or the coupling element consists of two parts. Such embodiments are suitable in particular in the case of relatively large hinges, in order to bring about the necessary flexural elasticity. The clearances are in this case arranged such that the force-transferring regions are not influenced or are only influenced to the desired extent. The clearances may in this case, as in this embodiment, cover only part of the coupling element 6 or reach up to the bending regions 9. It goes without saying that, for example for esthetic reasons, for the purpose of saving material or for influencing the hinge kinematics, the intermediate parts 4.2 may also have corresponding material clearances. However, it must be ensured that a certain stiffness of the intermediate parts 4 is retained, in order that the movement sequence according to the invention is ensured and that uncoordinated inversion effects do not occur. In a special embodiment, it is possible, while retaining the flexural stiffness of the intermediate parts 4, to increase the snapping effect by a torsional spring action of the intermediate parts 4. The intermediate parts are accordingly designed such that they are flexurally rigid in the longitudinal direction in relation to the coupling elements 6, 7 and do not permit buckling. In the transverse direction with respect to the connecting arms 5, the intermediate parts 4 are designed such that they act in this direction as torsional springs, for example by being shaped in a lamella-like or rib-like manner. In this way, when the hinge arrangement is actuated the torsional moment of the intermediate parts 4 assists the spring force brought about by the coupling elements.

Figure 20:
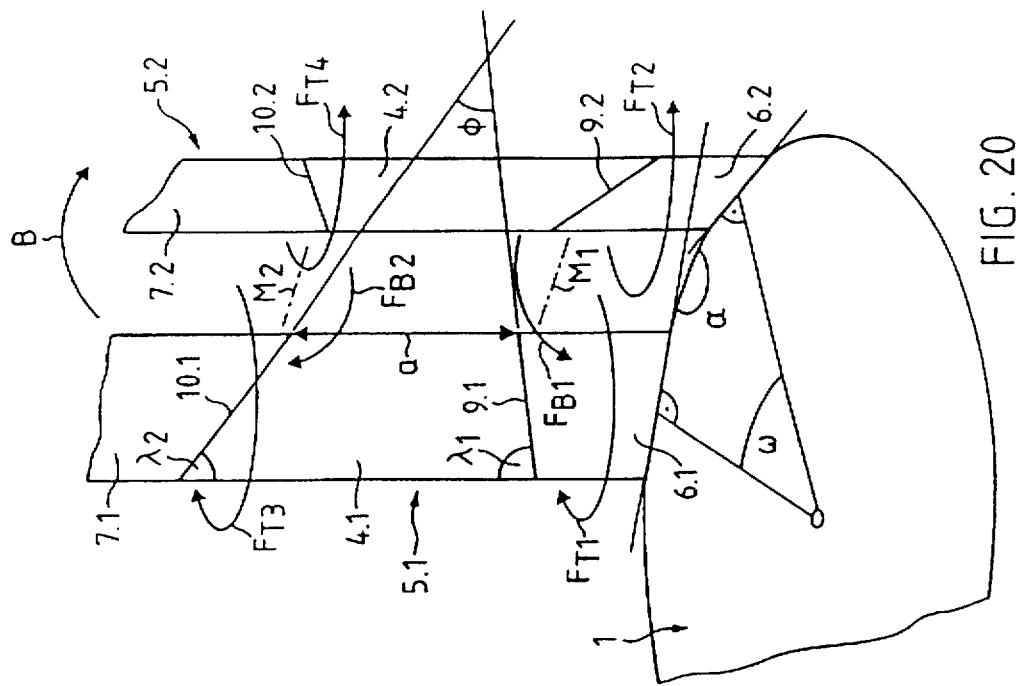
FIG. 20 shows in a diagrammatic representation the movement sequence of an exemplary embodiment with asymmetrically running bending regions 9, 10.
Figure 22:
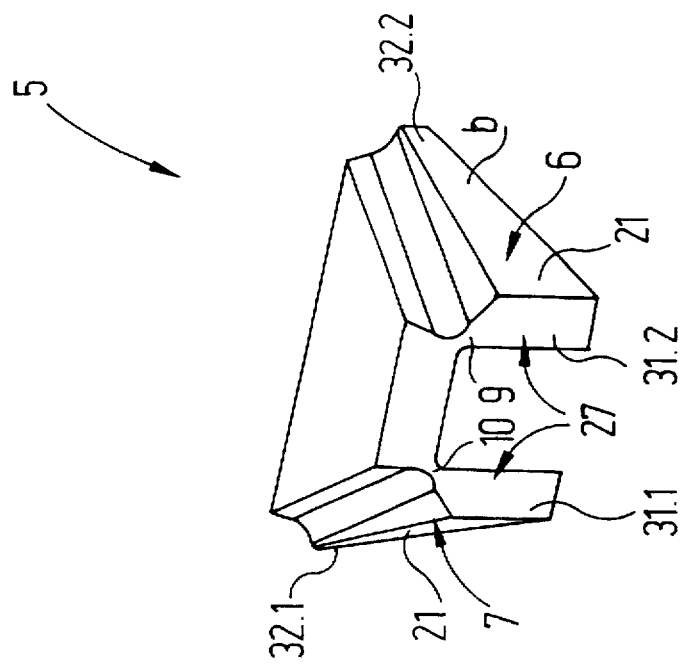
FIG. 22 shows an exemplary embodiment of a connecting arm 5 in a detailed, three-dimensional representation.

FIG. 22 shows a detailed view of a connecting arm 5 in which, as in the case of the exemplary embodiment according to FIG. 20, the coupling elements 6, 7 are arranged rigidly and perpendicularly with respect to the closure parts. The arch of a bridge thereby resulting in a 180° opened position of the hinge parts, not shown here, then exhibits the present form. The angle Φ enclosed by the bending regions is chosen according to the invention such that, in this 180° opened bridge-arch position, the connecting arm, in particular the coupling elements 6, 7, is in a stress-free state. In this exemplary embodiment, the coupling elements have a further particularly preferred form. The wall thickness of the coupling elements is reduced from the compressive edges 31.1, 31.2, visible from the front, to the tensile edges 32.1, 32.2, lying at the rear in this figure. It is achieved by this means that flexural and torsional properties of the coupling elements can be determined uniformly over the entire width b. The wall thickness is preferably made such that the flexural and torsional properties produced over a finite region along the width b are as uniform as possible. In an approximation, the wall thickness is continuously reduced, the wall thicknesses at the compressive edges 31.1, 31.2 forming the same ratio in relation to the wall thicknesses at the tensile edges 32.1, 32.2 as the heights of the tensile edges and compressive edges with respect to each other. If the outer surface 27 of the connecting arm 5 is adapted to the outer contour of a closure, for example lies in a cylindrical surface area, the inner side 21 of the coupling elements may be adapted to this outer contour or else, as in the exemplary embodiment represented, run in a planar surface area.

Figure 23:
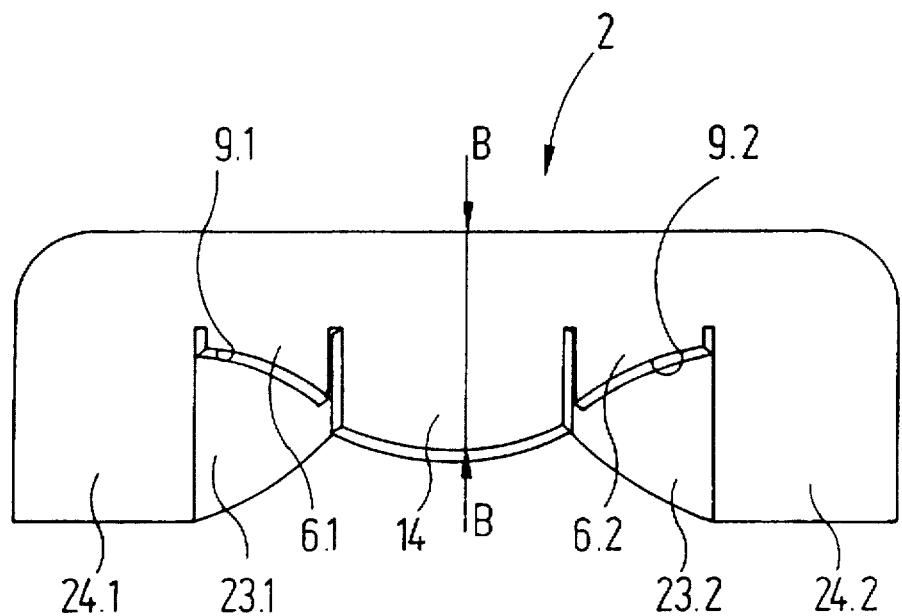
FIG. 23 shows an exemplary embodiment for the sealing of the hinge region for a closure cover.

FIG. 23 shows a preferred embodiment for a sealing of the hinge region. Represented is a closure cover 2 with two coupling elements 6.1, 6.2 arranged rigidly, perpendicular on the closure part 2. For the sake of clarity, the other regions of the connecting arms, i.e. the intermediate parts and the coupling elements, which are connected to the other closure part, are not shown. The coupling element has thus been severed at the bending regions 9.1, 9.2. The closure cover has a round cross section, i.e. the coupling elements 6.1, 6.2 lie here in the corresponding cylinder wall. Between the coupling elements there can be seen a web 14, which is designed here in wall form as part of the cylinder wall and lies within the outer contour of the closure. Connected to the web 14 are two thin walls or membranes 23.1, 23.2, which connect said web in turn to the outer regions 24.1, 24.2 of the cylinder wall of the closure. The lower closure part or closure body may be equipped with membranes in a similar way, so that by means of web 14 and membranes a dusttight connection is accomplished in the hinge region. The magnitude of the membranes of the two closure parts is preferably made such that they touch or overlap each other. Instead of membranes 23.1, 23.2 which are arranged between web 14 and regions 24.1, 24.2 of the closure wall, according to the invention continuous membranes between the regions 24.1, 24.2 may also be provided. It is important that these membranes do not adversely affect the functionality of the coupling elements, i.e. do not prevent the relieving movement according to the invention.

Figure 24:
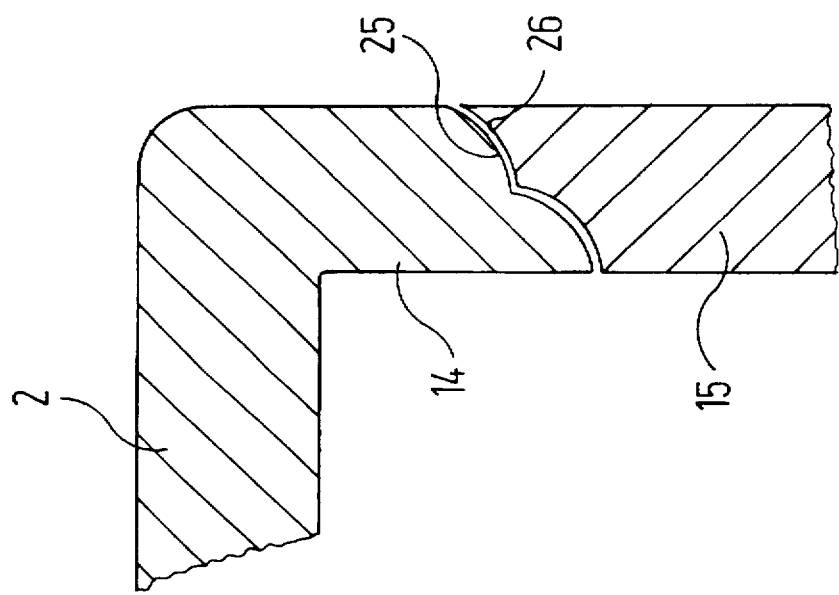
FIG. 24 shows a section through the web 15 according to FIG. 23 along a line of intersection B—B.

FIG. 24 shows a section through the web 14 of the exemplary embodiment according to FIG. 23 along the line of intersection B—B. The closure body, not shown in this FIG. 24, has a corresponding web 15, which protrudes upward. In order to achieve as tight a connection as possible between the connecting arms, the two webs 14 and 15 overlap each other. As can be seen from the figure, the web 15 has in cross section a terminating edge 26, which corresponds to the terminating edge 25 of the web 14. In order that the closure kinematics are not hindered by the overlapping webs, according to the invention it is provided that the terminating edge of the web 15 has in cross section substantially a concave form, and that of the closure cover, which after all is swung outward, has a substantially convex form, in order to achieve as good a guidance and sealing as possible. It goes without saying that it is also possible to provide cross sectionally straight terminating edges for both webs.

Figure 25:
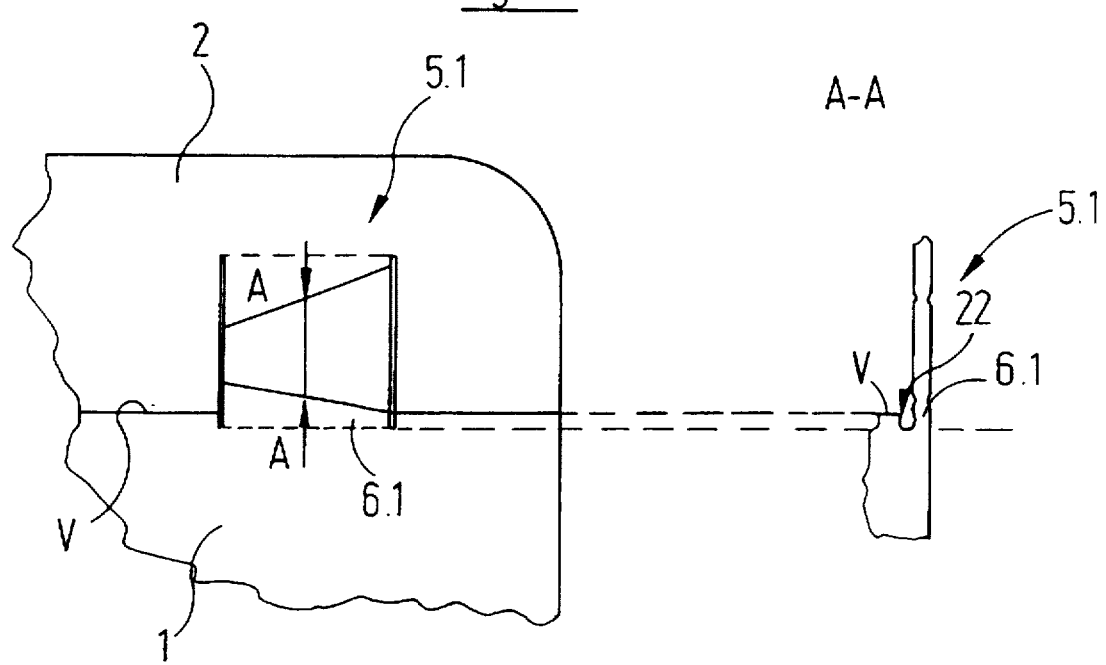
FIG. 25 shows an exemplary embodiment with low height of the closure cover.

In order to be able to achieve a lower overall height of the closure, it is advantageous not to attach the coupling elements of the closure body 1 on the closing plane V, but to offset them downward in the longitudinal direction along the generatrices of the closure. This measure is illustrated in FIG. 25. The coupling element 6.1 of a connecting arm 5.1 is arranged (partially) underneath the closure plane V. The cross section A—A through the connecting arm clearly shows that in this way the coupling elements are formed by means of an undercut 22, in order that the coupling elements 6 can protrude movably according to the invention, in order to execute the relieving movement. In a corresponding way, it is possible to displace the connecting arms 5 even further downward and to integrate them almost completely into the closure body. This makes it possible to realize a closure cover or a hinge part with minimal overall height and to design it, for example, as a flat plate.

Figure 26:
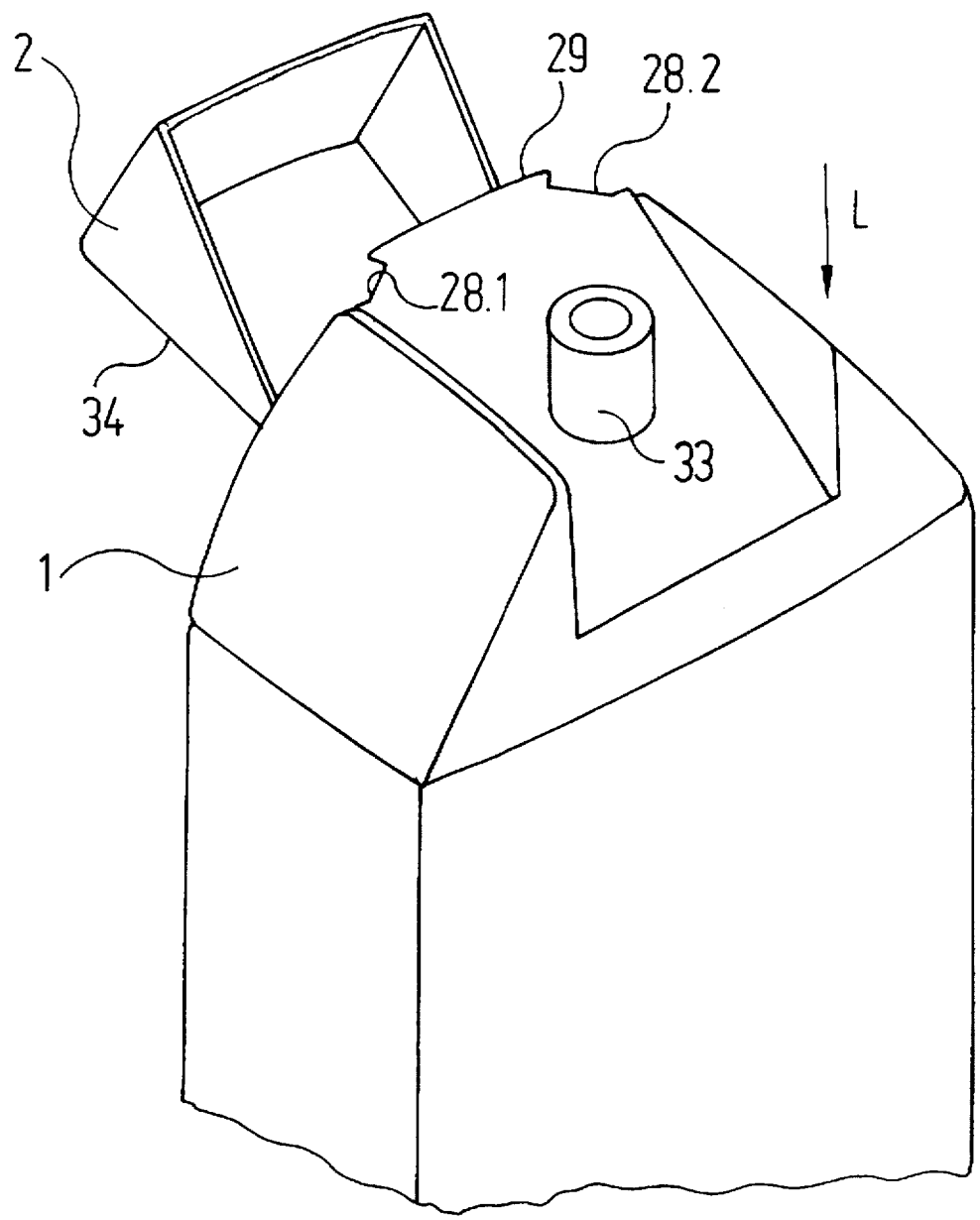
FIGS. 26–29 show further exemplary embodiments of the invention.

FIG. 26 shows an exemplary embodiment with a hinge arrangement integrated into the closure body 1. In the closed state of the closure, the connecting arms, not visible in this figure, lie within the outer contour of the closure and are received by recesses 28.1, 28.2. At the connecting location between connecting arm and the closure cover 1, the latter has an only very small, minimal height or wall thickness. As can be seen particularly well in this representation, in this position of the closure cover 2 opened approximately 180°, the hinge arrangement allows said cover to be pivoted far rearwardly and downwardly. In the longitudinal direction L of the closure, the closure cover thus lies underneath the upper edge 29 of the closure body and allows unhindered access to the spout 33. If a plurality of pivoting positions are provided, the closure according to this exemplary embodiment also allows an opening of up to 270°. The closure cover then touches with its rear edge 34 the outer surface of the container represented here.

It is readily evident that the bending regions 9, 10, and the additional bending regions 11, 12, must not be understood in a narrow interpretation. Rather, for the hinge movement according to the invention, it is important that the flexural rigidity in these bending regions clearly differs from the stiffness of the coupling elements, intermediate parts etc. and brings about a defined bending around of the connecting arms 5 in areal or linear bending regions 9, 10, 11, 12 (concentration of the bending-around effects). The other parts of the connecting arms 5, on the other hand, are to be elastically stressed only slightly in order to bring about the elongation relief according to the invention. This ensures that the hinge executes a selected pivoting movement and that undefined inversion processes ("tumbling movements") are not produced. For example, by the use of different materials (different moduli of elasticity) for bending and intermediate regions, the solution according to the invention can be achieved in an equivalent manner. In the same way, the required effect can be achieved and the required relieving movement can be accomplished for example by stiffening of the intermediate regions (for example by ribs or special shaping). Since primarily exemplary embodiments with film hinges are represented in the figures, the bending regions 9, 10, 11, 12 have been represented as only narrow. If the bending regions are realized in some other way, for example materials with high flexural elasticity, the bending regions are correspondingly wider. It is also evident in particular from FIGS. 9 and 10 that the bending regions 9, 10 generally experience greater bending-around effects than any additional bending regions 11, 12 which may be present. The various bending regions therefore do not have to have identical bending properties, but can, if required, have characteristics optimized in a way corresponding to their stressing.

For special applications, mixed embodiments having a bending region 12 without a snapping effect on the cover side and a further bending region 11 on the closure body are also conceivable. It goes without saying that the inventive idea also comprises solutions in which the coupling elements have additional connections (for example radial or lateral supporting struts) with the hinge parts, as long as the required elongation-relieving movement for the intermediate parts 4 is ensured.

Figure 27:
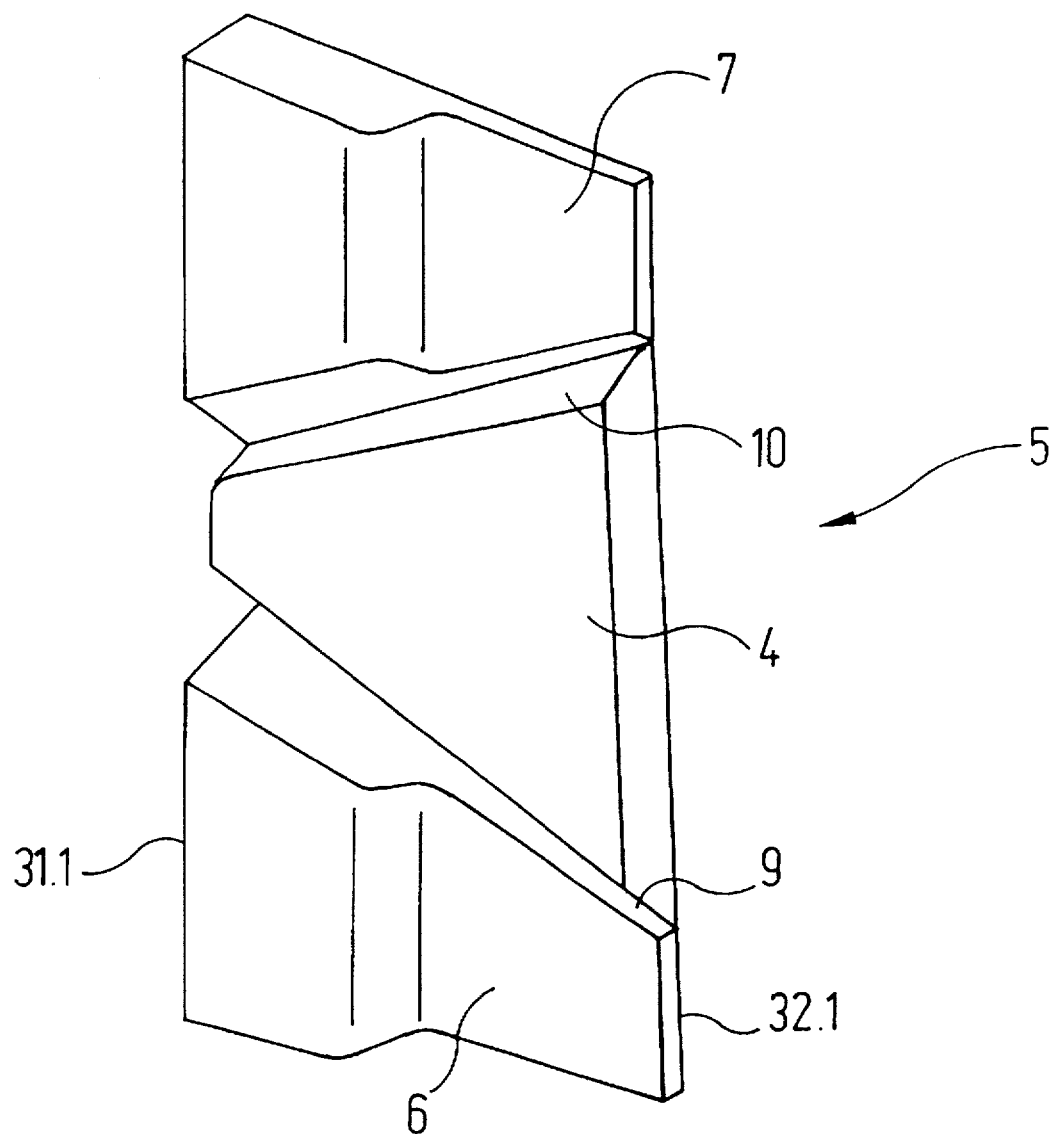
Figure 28:
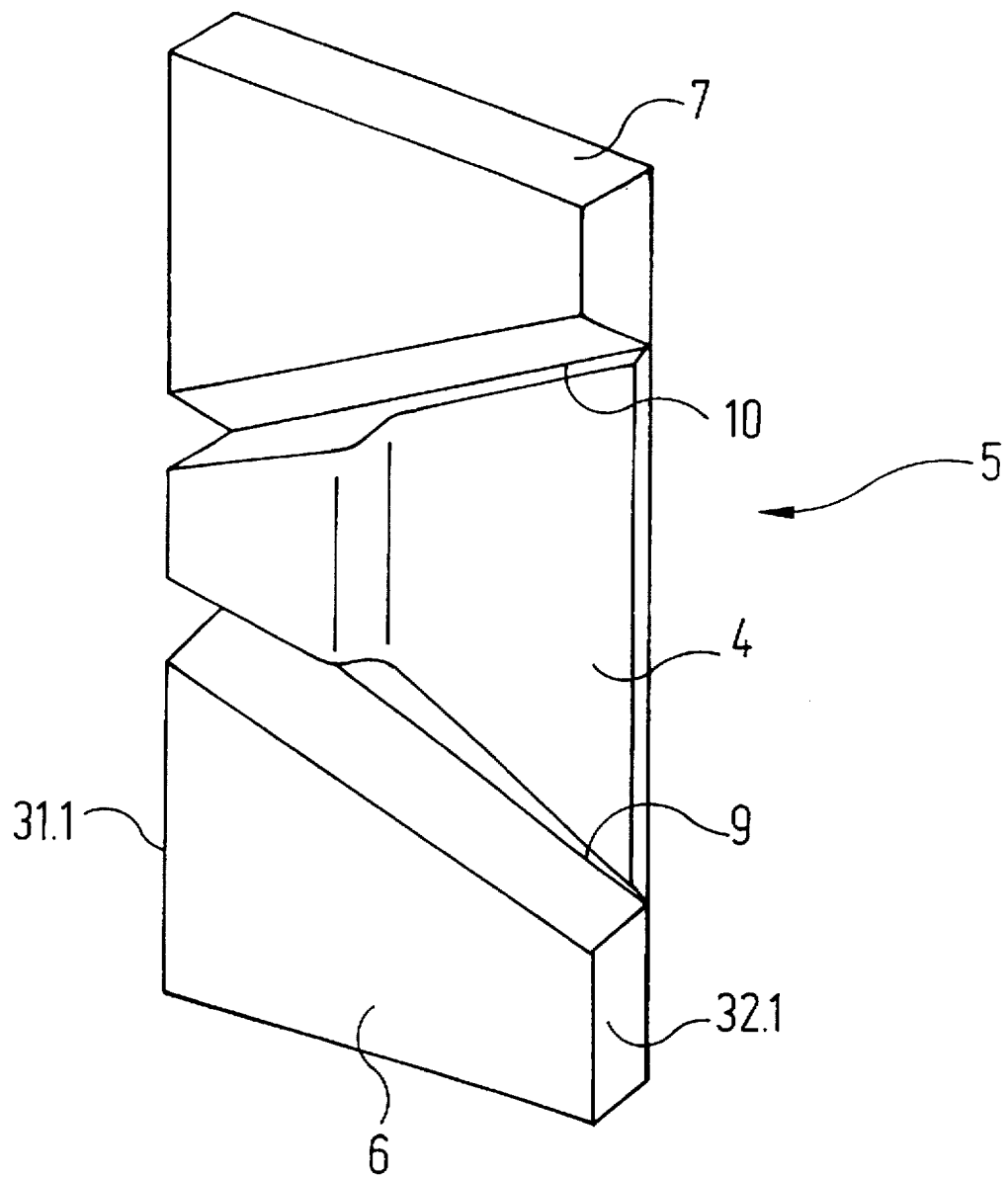
Figure 29:
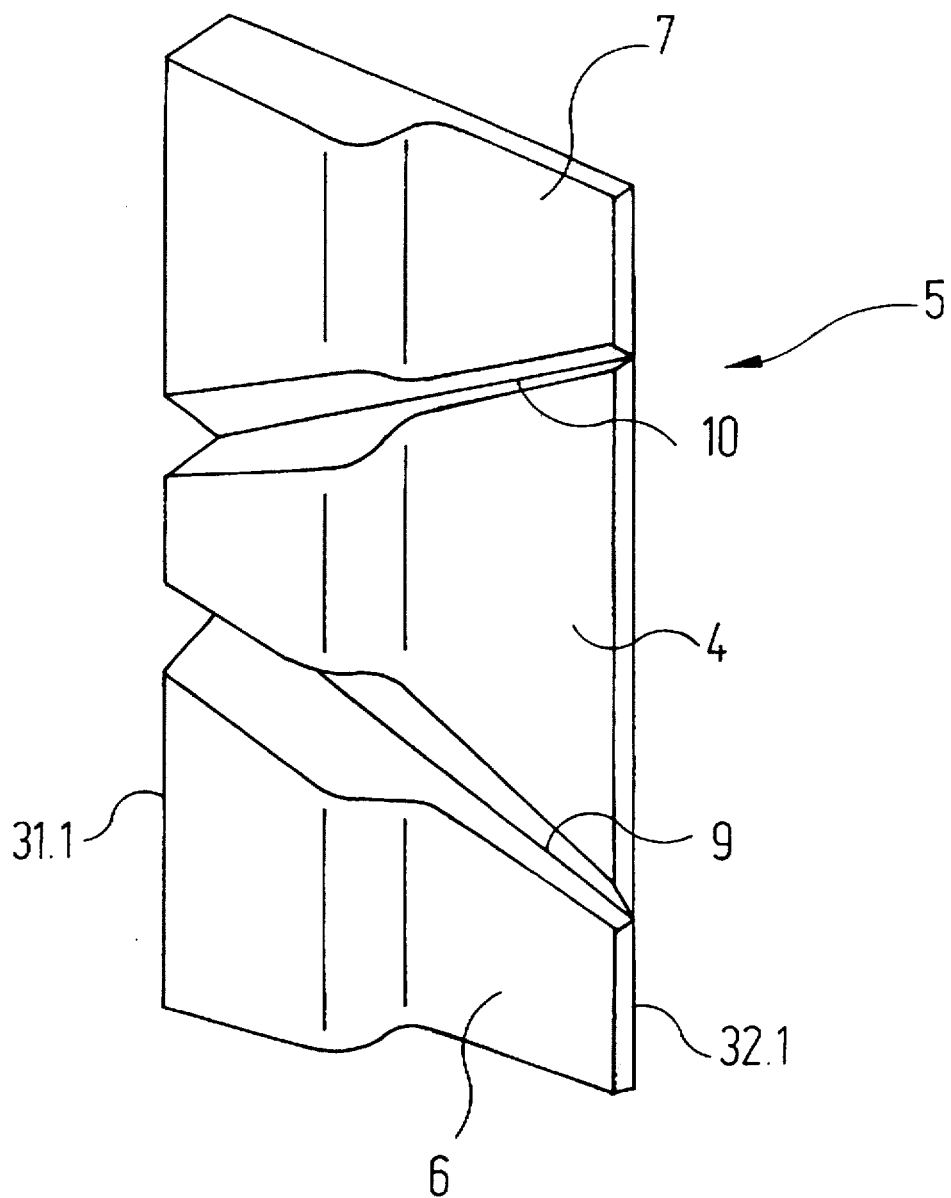

With reference to FIGS. 27 to 29, further embodiments of the invention, which use in an optimized way the tension/compression profile produced transversely with respect to the connecting arms, already explained further above, are to be explained in more detail. The snapping effect of the closure is accomplished according to the invention by the elastic deformations or the spring effect and the interaction of the elements of the connecting arms 5, i.e. of the coupling elements 6, 7 and of the intermediate element 4. On opening (and closing) of the closure, the stresses decisive for the snapping effect are produced on account of the arrangement and configuration of these elements 4, 6, 7 according to the invention. As described with reference to FIGS. 13 and 20, torsional stresses acting on the coupling elements 6, 7 are produced about the longitudinal axis of each connecting arm 5. Along the shorter side of the coupling elements, on the tensile edge 32.1, a tensile region is built up, and along the longer side of the coupling elements, on the compressive edges 31.1, a compressive region is built up (longitudinal stressing). By reason of the function, these tensile and compressive stresses are greatest on these outer edges 31.1, 32.1 of the connecting arms 5. The torsional and longitudinal stresses are coupled with one another and are built up by a linear load, which is introduced into the intermediate elements 4 at the bending regions 9, 10. This loading process can be readily understood if a vectorial consideration is undertaken and the forces along the line load are interpreted as components of torsional and tensile/compressive forces.

In the consideration of the equilibrium of forces, it is readily evident that here the intermediate elements 4 are loaded essentially only by forces in the direction of the longitudinal axis of the connecting arms and, upon actuation of the closure, have the tensile and compressive regions described further above, the tensile forces occurring primarily on the longer side edge of the intermediate element 4, on the tensile edge 32.1, and the compressive forces occurring on the shorter edge, on the compressive edge 31.1. As can be seen from FIGS. 27-29, these longitudinal forces are introduced from the bending regions 9, 10 eccentrically into the intermediate element 4, i.e. in these configurations the film hinges are attached in the region of the outer surface, not visible here, of the intermediate elements 4. On account of such eccentricities, a secondary bending can occur on the compressive sides of the intermediate elements 4, but is largely avoided according to the invention. The flexurally rigid configuration of the intermediate elements 4, according to the invention, is therefore important.

Represented in FIG. 27 is a particularly advantageous embodiment of the coupling elements, which utilizes the tensile/compressive relationships well. The coupling elements 6, 7 are designed in a mirror-inverted manner and consequently, by reason of their symmetry, lead to identical stresses. The coupling elements 6, 7, acting as spring elements, have a relatively solid, web-like configuration in the compressive region toward the compressive edge 31.1. As a result, disadvantageous buckling of the coupling elements is avoided. On the other hand, the tensile regions of the coupling elements on the tensile edge 32.1 are made to be much thinner and can thus act optimally as tension, flexion and torsion springs. As in the case of the previous embodiments, the intermediate element 4 is made to have uniform stiffness.

FIG. 28 then shows an embodiment in which the intermediate element 4 has a wall thickness varying over the width of the connecting arms. In this case, it is important that, according to the invention, the intermediate element nevertheless acts as a substantially flexurally rigid plate, i.e. that this wall thickness variation does not lead to any bending of the intermediate elements upon actuation of the hinge. It can be seen well that, in the compressive region on the compressive edge 31.1, the intermediate element is of a solid design, in order to prevent buckling or bending. On the longer edge of the intermediate element 4, i.e. on the tensile edge 32.1, the wall thickness is reduced, however, for example to ⅓ or ¼ of the wall thickness in the compressive region, and allows an increase in the overall spring effect of the system, this region assuming the function of a tension spring. In the case of relatively small PP closures, this tensile region may be designed, for example, as a thin film of, for example, 0.25–0.5 mm. It should be stressed once again here that the intermediate element retains its function as a flexurally rigid element and the occurrence of unwanted deformations due to bending is to be avoided. Consequently, during the actuation of the hinge, no bendings of the intermediate element 4 occur along the tensile edge 32.1 either. The coupling elements 6, 7 have here a substantially rectangular cross section and a wall thickness which is greater than the wall thickness of the intermediate element in the tensile region at the tensile edge 32.1 (cf. wall thickness proportions in FIG. 28).

FIG. 29 then shows an exemplary embodiment which has a favourable spring behavior, in that it includes the features of the embodiments according to FIGS. 27 and 28. Both the coupling elements 6, 7 and the intermediate elements 4 have in the region of the compressive edge 31.1 a solid wall thickness and thus avoid buckling. On the other hand, the tensile region on the tensile edge 32.1 is greatly reduced and participates in the spring effect, as described above. The cross sections of the coupling elements 6, 7 and of the intermediate element 4 correspond in this example. It is important also in the case of this embodiment that the intermediate part 4 has a geometry to keep the intermediate part 4 flexurally rigid during the actuation of the hinge. The transition between the different wall thicknesses may be relatively abrupt, take place over a relatively large region or else at different locations in the longitudinal direction, depending on the desired spring behavior. The features referred to can also be combined advantageously with the further features of the invention presented above.

We claim:

1. A resilient hinge arrangement, comprising:

a first hinge part (1), a second hinge part (2) that assumes a plurality of stable pivoting positions with respect to said first hinge part (1) with a dead center lying at least between two of said stable pivoting positions, said second hinge part (2) being arranged to pivotably move from pivoting positions between said two stable pivoting positions, through said dead center, outside said dead center itself, in an elastically resilient manner into a nearest one of said stable pivoting positions, two connecting arms (5) spaced a distance apart comprising at least one coupling element (6, 7, 16) protruding movably from each of said first hinge part (1) and second hinge part (2), and at least one substantially flexurally rigid intermediate part (4) between said coupling elements (6, 7, 16) that is delimited by two bending regions (9, 10, 11) that are spaced apart and arranged at an angle to each other between said intermediate part and said coupling elements (6, 7, 16), wherein:

each of said two connecting arms (5) is substantially stress-free in an opened position and a closed position of said first hinge part (1) relative to said second hinge part (2) at a point at which said bending regions (9, 10, 11) come closest to each other, and each coupling element (6, 7, 16) is arranged to execute a maximum elastic relieving movement in a region of said dead center upon said pivoting movement of said second hinge part (2) with respect to said first hinge part (1) between said two stable pivoting positions through said dead center.

2. The hinge according to claim 1, wherein said bending regions (9, 10, 11) are spaced apart at said point at which said bending regions (9, 10, 11) come closest to each other such that each coupling element (6, 7, 16) extends in said opened position substantially perpendicular to a closing plane of said first hinge part (1) and said second hinge part (2).

3. The hinge according to claim 2, wherein said angle Φ has a value that corresponds to 2·ArcTan (Cos α/2), where α is the angle enclosed by said connecting arms (5).

4. The hinge according to claim 1, wherein said angle at which said bending regions (9, 10, 11) are arranged to each other has a value that satisfies the formula:

$$\text{Tan}\frac{\Phi}{2} = \text{Cos}\frac{\omega}{2} \cdot \text{Cos}\frac{180° - \zeta}{2} + \text{Tan}\frac{\Phi}{2} \cdot \text{Sin}\frac{180° - \zeta}{2}$$

where Φ angle is the angle formed between said bending regions (9, 10, 11),

ω is the angle which is formed by two lines standing perpendicular on said connecting arms (5), and ζ is the effective opening angle.

5. The hinge according to claim 1, wherein said bending regions (9, 10) are at unequal angles ($\lambda_1$, $\lambda_2$) with respect to edges of said connecting arms (5).

6. The hinge according to claim 1, further comprising additional bending regions (11, 12) arranged substantially transversely with respect to said connecting arms (5) by which said connecting arms (5) are connected to said first hinge part (1) and said second hinge part (2).

7. The hinge according to claim 1, wherein said connecting arms (5) are arranged assymetrically with respect to a closing plane of said first hinge part (1) and said second hinge part (2).

8. The hinge according to claim 1, wherein said connecting arms (5) have a kinked form, lying in one plane, and are arranged parallel to each other over part of their length such that they are spaced at opposite ends a different distance ($k_1$, $k_2$) apart.

9. The hinge according to claim 1, wherein at least one coupling element (6, 7, 16) has a thickness that is varied such that flexural and torsional stresses are substantially the same entirely over said coupling element.

10. The hinge according to claim 9, wherein said coupling element (6, 7) has a longer side edge and a shorter side edge, and said thickness of said coupling element decreases continuously from said longer side edge to said shorter side edge.

11. The hinge according to claim 1, wherein each of said coupling elements (6, 7) has a longer side (31) which is under tensile stress, a shorter side (32) which is under compressive stress and a stress-neutral region (N) lying between said longer side edge (31) and said shorter side edge (32), during pivoting of said second hinge part (2) with respect to said first hinge part (1).

12. The hinge according to claim 11, wherein said stress-neutral region (N) lies in a central one-third portion between said shorter side edge (32) and said longer side edge (31).

13. The hinge according to claim 1, wherein at least one of said coupling elements (6) has a convexity (20) perpendicular to its longitudinal direction (R).

14. The hinge according to claim 1, wherein at least one coupling element (6) has at least one reinforcing rib (12) that changes its flexural rigidity.

15. The hinge according to claim 1, wherein at least one coupling element (6) has a material thinning (18) that changes its flexural rigidity.

16. The hinge according to claim 1, wherein said at least one coupling element (6) has a clearance (19) that changes its flexural rigidity.

17. The hinge according to claim 16, wherein said coupling element (6) comprises two parts enclosing said clearance (19).

18. The hinge according to claim 1, wherein said intermediate part (4) is flexurally rigid in a longitudinal direction of said coupling elements (6, 7) and provides a torsion spring effect in a direction transverse to said longitudinal direction.

19. The hinge according to claim 18, wherein said coupling elements (6, 7) comprise lamellae or ribs running in said longitudinal direction.

20. The hinge according to claim 1, further comprising membranes (23) formed along inside surfaces of said first hinge part (1) and said second hinge part (2), respectively, wherein said connecting arms (5) are arranged, seen from outside said hinge, in front of said membranes (23).

21. The hinge according to claim 20, wherein said membranes (23) touch or overlap in said closed position.

22. The hinge according to claim 1, further comprising a web (14, 15) arranged on at least one of said first hinge part (1) and second hinge part (2) between said connecting arms (5).

23. The hinge according to claim 22, wherein in said closed position said web (14, 15) protrudes beyond a closing plane of said first hinge part (1) and said second hinge part (2) into a recess in the other of said first and second hinge parts (1, 2).

24. The hinge according to claim 22, wherein a first and a second said web (14, 15) are provided on said first hinge part (1) and said second hinge part (2) respectively between said connecting arms (5) and overlap or touch each other.

25. The hinge according to claim 1, wherein said first hinge part (1) and said second hinge part (2) each has an overlapping terminating edge (25, 26) lying between said two connecting arms (5).

26. The hinge according to claim 25, wherein said terminating edges (25, 26) of said first hinge part (1) and said second hinge part (2) have resspective regions that are complementarily convex and concave in shape.

27. The hinge according to claim 1, wherein at least one of said connecting arms (5) is attached to one of said first hinge part (1) and said second hinge part (2) underneath a closing plane of said first hinge part (1) and said second hinge part (2) and is raised up from said one hinge part by an undercut (22).

28. The hinge according to claim 1, wherein in said closed position, said connecting arms (5) are accommodated by recesses (28) on at least one of said first hinge part (1) and said second hinge part (2).

29. The hinge according to claim 1, each of said connecting arms (5) includes two of said bending regions (9, 10, 11) and said intermediate part (4), whereby said hinge arrangement is bistable.

30. The hinge according to claim 1, wherein each of said connecting arms (5) includes three of said bending regions (9, 10, 11) with alternatingly positive and negative inclinations with respect to side edges of said connecting arms (5) whereby said said hinge arrangement is twistable.

31. The hinge according to claim 1, wherein said intermediate element (4) has in a tensile region neighboring tensile edges (32.1, 32.2) a wall thickness that is reduced in comparison with a wall thickness in a compressive region neighboring compressive edges (31.1, 31.2), and said intermediate element (4) acts as a tension spring.

* * * * *

UNITED STATES PATENT AND TRADEMARK OFFICE
CERTIFICATE OF CORRECTION

PATENT NO. : 5,794,308
DATED : August 18, 1998
INVENTOR(S) : Rentsch

It is certified that error appears in the above-identified patent and that said Letters Patent is hereby corrected as shown below:

Column 4, line 15, cancel "L$\Theta$1.L$\Theta$2 [sic]" and insert -- $L_1$, $L_2$ --. Column 5, line 48, cancel "$L_2/_L1$ [sic]" and insert -- $L_2/L_1$ --. Column 10, line 60, Column 11, lines 8, 30 and 50 and Column 16, line 50 cancel "1" and insert -- 2 --. Column 11, line 16, cancel "$k_1 > k_2$" and insert -- $k_1 < k_2$ --; line 21, cancel "$k_1 < k_2$" and insert -- $k_1 > k_2$ --. Column 12, line 6, cancel "k$\Theta$1, k$\Theta$2 [sic]" and insert -- $k_1$, $k_2$ --; line 66, cancel "360°" and insert -- 180° --.

In claim 1, column 19, line 14, following "arrangement" insert -- without a joint axis of rotation --; line 26, following "one" insert -- flexible --; lines 26 and 27, cancel "protruding movably from" and insert -- arranged movably at --; lines 38 and 39, cancel "at a point" to and including "each other".

In claim 30, column 22, line 14, cancel "twistable" and insert -- tristable --.

Signed and Sealed this

Twenty-sixth Day of January, 1999

Attest:

Attesting Officer

*Acting Commissioner of Patents and Trademarks*